United States Patent
Ray Chaudhuri et al.

(10) Patent No.: US 9,674,755 B2
(45) Date of Patent: Jun. 6, 2017

(54) INTRA AND INTER-FREQUENCY HANDOVER IN LTE WITH UPLINK AND DOWNLINK METRICS

(71) Applicant: QUALCOMM Incorporated, San Diego, CA (US)

(72) Inventors: Kausik Ray Chaudhuri, San Diego, CA (US); Rao Sanyasi Yenamandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/156,387

(22) Filed: Jan. 15, 2014

(65) Prior Publication Data

US 2015/0201360 A1    Jul. 16, 2015

(51) Int. Cl.
*H04Q 7/10* (2006.01)
*H04W 36/30* (2009.01)
*H04W 36/16* (2009.01)

(52) U.S. Cl.
CPC ......... *H04W 36/30* (2013.01); *H04W 36/165* (2013.01)

(58) Field of Classification Search
CPC ..... H04W 36/08; H04W 36/26; H04W 36/30; H04W 36/24; H04W 36/16
USPC .......... 455/436, 452.2, 432.1; 370/235, 332, 370/395.21
See application file for complete search history.

(56) References Cited

U.S. PATENT DOCUMENTS

| 7,248,875 | B2 | 7/2007 | Schreuder et al. |
| 7,602,722 | B2 * | 10/2009 | Chheda ........................ 370/236 |
| 8,483,184 | B2 * | 7/2013 | Yokoyama et al. .......... 370/332 |

(Continued)

FOREIGN PATENT DOCUMENTS

| EP | 1038411 A2 | 9/2000 |
| EP | 2197236 A1 | 6/2010 |

(Continued)

OTHER PUBLICATIONS

ISA/EPO, International Search Report and the Written Opinion of the International Searching Authority, Int'l. App. No. PCT/US2015/010149, Apr. 2, 2015, European Patent Office, Rijswijk, NL, 14 pgs.

(Continued)

*Primary Examiner* — Ajit Patel
*Assistant Examiner* — Julio Perez
(74) *Attorney, Agent, or Firm* — Holland & Hart

(57) ABSTRACT

Methods, systems, and devices are described for managing a handover of a UE based on consideration of both the uplink and the downlink channel conditions. A handover of a user equipment from a serving base station to a target base station may be held over, prevented or inhibited even if the downlink channel measurement events are triggered and reported based on consideration of the uplink and the downlink metrics. Such determination may also be based on weight factors associated with the uplink and the downlink metrics. The weight factors may communicate to the base station a relative value of the uplink and the downlink transmission for a user equipment. In other examples, a handover of the user equipment may be either initiated or held over based on a calculation of a loading delta that indicates an overall gain or loss that may be realized between the serving base station and the target base station.

21 Claims, 15 Drawing Sheets

(56) References Cited

U.S. PATENT DOCUMENTS

| | | | |
|---|---|---|---|
| 8,837,290 B2* | 9/2014 | Dimou et al. | 370/235 |
| 8,842,676 B2* | 9/2014 | Park | H04W 72/1268 |
| | | | 370/230 |
| 2006/0079288 A1* | 4/2006 | Lindoff | H01Q 3/2605 |
| | | | 455/562.1 |
| 2006/0094430 A1 | 5/2006 | Shah | |
| 2007/0015511 A1* | 1/2007 | Kwun et al. | 455/436 |
| 2007/0281688 A1* | 12/2007 | Tajima | 455/433 |
| 2009/0028112 A1 | 1/2009 | Attar et al. | |
| 2009/0154426 A1* | 6/2009 | Perraud et al. | 370/332 |
| 2011/0183702 A1* | 7/2011 | Weaver et al. | 455/522 |
| 2011/0261747 A1* | 10/2011 | Wang et al. | 370/315 |
| 2012/0008850 A1 | 1/2012 | Jones et al. | |
| 2012/0021788 A1 | 1/2012 | Yavuz et al. | |
| 2014/0211756 A1* | 7/2014 | Bontu et al. | 370/331 |

FOREIGN PATENT DOCUMENTS

| | | | |
|---|---|---|---|
| SE | WO 01/01720 | * | 1/2001 |
| WO | WO-2009120509 A1 | | 10/2009 |

OTHER PUBLICATIONS

Cho S., et al., Hard Handoff Scheme Exploiting Uplink and Downlink Signals in IEEE 802.16e Systems, IEEE 63rd Vehicular Technology Conference, VTC 2006-Spring, 2006, vol. 3, pp. 1236-1240.
IPEA/EPO, Second Written Opinion of the International Preliminary Examining Authority, Int'l. App. No. PCT/US2015/010149, Dec. 17, 2015, European Patent Office, Munich, DE, 7 pgs.

* cited by examiner

INTRA AND INTER-FREQUENCY HANDOVER IN LTE WITH UPLINK AND DOWNLINK METRICS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple user equipments (UEs such as mobile devices). Base stations may communicate with UEs on downlink channels (e.g., for transmission from a base station to a UE) and uplink channels (e.g., for transmission from a UE to a base station). Each base station has a coverage range, which may be referred to as the coverage area of the cell. As a UE moves from one coverage area of the cell to the next, it may become necessary for the serving base station to handover communication of the UE to a target base station. Handover allows for a UE to remain connected to a base station providing satisfactory downlink channel conditions.

In a conventional wireless network, intra or inter-carrier handover processes of a UE are initiated based solely on the downlink channel measurements (i.e., transmission conditions from the base station to the UE). Therefore, as the downlink channel conditions deteriorate between the serving base station and the UE, a handover process is initiated to transfer the UE control from the serving base station to a target base station that may provide improved downlink channel conditions.

However, uplink performance of a UE may not always correspond to its downlink performance. For example, based on user's mobility from one cell to the next, the downlink channel conditions of the UE may improve, while the uplink channel conditions of the UE may remain unaffected. As a result, while the target base station may provide improved downlink channel conditions for the UE following a handover, the uplink channel conditions at the target cell may not be ideal. Therefore, triggering a handover based solely on the downlink channel measurements may not be optimal for a user engaged in an uplink data communication.

SUMMARY

The present disclosure generally relates to one or more improved systems, methods, and/or apparatuses for managing a handover of a UE based on consideration of both the uplink and the downlink channel conditions. In certain embodiments, a handover of a user equipment from a serving base station to a target base station may be held over, deferred, prevented or inhibited based on the consideration of the uplink and the downlink metrics. Such determination may be based on weight factors associated with the uplink and the downlink metrics. The weight factors may communicate to the base station a relative value of the uplink and the downlink transmission for a user equipment. In other examples, a handover of the user equipment may be either initiated or held over based on a calculation of a loading delta that indicates an overall gain or loss in user experience that may be realized between the serving base station and the target base station.

In a first set of illustrative examples, a method for managing handover in a wireless communication is described. In one example, the method includes receiving, at a serving base station, at least one uplink metric. The uplink metric may be associated with a first weight factor. The method may further include applying the first weight factor to the uplink metric to generate a weighted uplink metric and holding over a handover process from the serving base station to a target base station based at least in part on the weighted uplink metric.

In certain examples, the method may further include receiving, at the serving base station, at least one downlink metric, the downlink metric being associated with a second weight factor. The method may include applying the second weight factor to the downlink metric to generate a weighted downlink metric and initiating the handover process from the serving base station to the target base station based at least in part on a comparison of the weighted downlink metric and the weighted uplink metric.

In further examples, uplink metrics may comprise at least one of a power headroom report (PHR), a buffer status report (BSR), a Rise over Thermal (RoT), and a Physical Resource Block (PRB) load report. In such examples, the method may comprise determining that the serving base station has received successive negative power headroom reports (PHR) and that the buffer status report (BSR) indicates non-empty buffer. In yet further examples, the method may comprise determining that a serving cell RoT is greater than a target cell RoT or that a target cell uplink PRB load is less than a service cell uplink PRB load.

In further examples, the method may include requesting a reference signal receive power (RSRP) report for the serving base station and at least one neighbor base station based at least in part on the received PHR and BSR. The method may further include receiving a RSRP report for the serving base station and at least one neighbor base station in response to the request and sorting neighbor physical cell identify (PCIs) in descending order of the received RSRP report.

In yet another example, the method may comprise receiving, at the serving base station, a downlink metric. The method may comprise calculating an uplink and downlink loading delta, wherein the loading delta indicates an overall gain or loss between the serving base station and the target base station. In such instance, the loading delta may be based at least in part on both the uplink metric and the downlink metric. In further example, the method may comprise holding over the handover process upon determining that a net loss would be realized based at least in part on the loading delta. In an alternative example, the method may comprise triggering the handover process upon determining that a net gain would be realized based at least in part on the loading delta.

In further example, the method may comprise holding over the handover process after a handover event trigger has occurred. The handover event trigger may be based at least on one of a reference signal receive power (RSRP) metric or a reference signal receive quality (RSRQ) metric. In yet another example, the method may comprise holding over the handover process prior to an occurrence of a handover event trigger, the handover event trigger based at least in part on one of a RSRP or RSRQ metric.

In another example, the first weight factor may define a relative importance of an uplink data transfer. The first weight factor may be either user-defined or preset and received at the serving base station. In yet another example, the weight factors may be set by the serving base station. In another example, the method of holding over the handover process may comprise preventing, inhibiting, deferring or stopping the handover process.

In a second set of illustrative examples, an apparatus for managing handover in a wireless communication is described. In one example, the apparatus may comprise means for receiving, at a serving base station, at least one uplink metric. The uplink metric may be associated with a first weight factor. The apparatus may further comprise means for applying the first weight factor to the uplink metric to generate a weighted uplink metric and means for holding over a handover process from the serving base station to a target base station based at least in part on the weighted uplink metric.

In a third set of illustrative examples, an apparatus for preparing for a network handover is described. The apparatus may comprise a processor and a memory in electronic communication with the processor. The memory may embody instructions executable by the processor to receive, at a serving base station, at least one downlink metric. The downlink metric may be associated with a second weight factor. In the exemplary example, the method may further comprise applying the second weight factor to the downlink metric to generate a weighted downlink metric and triggering the handover process from the serving base station to the target base station based at least in part on a comparison of the weighted downlink metric and the weighted uplink metric.

In a fourth set of illustrative example, a method for managing a handover process is described. In one example, the method may comprise receiving, at a user equipment (UE), a measurement control message. The measurement control message may provide the UE with one or more reporting thresholds. The method of exemplary example may further comprise transmitting, in response to the measurement control message, at least one uplink metric. The at least one uplink metric may be associated with a first weight factor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
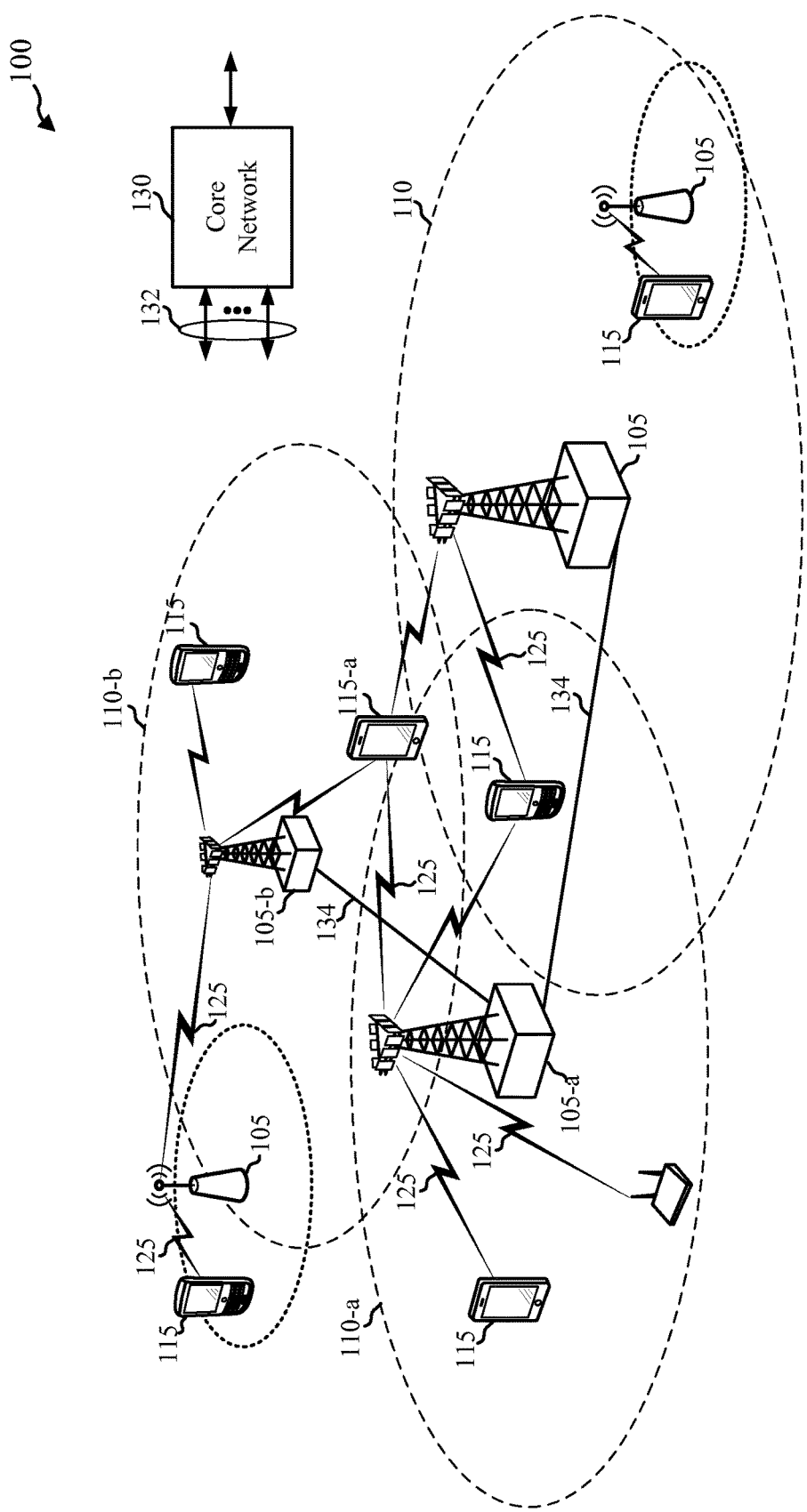
FIG. 1 shows a block diagram of a wireless communications system, in accordance with various aspects of the present disclosure.

Described embodiments are directed to systems and methods for managing a handover of a UE based on consideration of both the uplink and the downlink metrics. The decision to perform a handover in accordance with the present disclosure may be provided either prior to or following an event. The event may be based on a Reference Signal Received Power (RSRP) report and/or a Reference Signal Received Quality (RSRQ) report. One (or both) of these reports may cause the initiation of a handover of a UE from a serving base station to a target base station. In some examples, a handover process of a UE from a serving base station to a target base station may be held over, prevented, deferred or inhibited based on considerations of the uplink and the downlink channel conditions provided by the RSRP and RSRQ reports. Such a determination may be based on the weight factors associated with uplink and the downlink metrics associated with the uplink and downlink channel conditions. The weight factors may communicate to the serving base station the relative value of the uplink and the downlink transmissions for a UE. In certain examples, a handover of the UE may be either initiated or held over based on a calculation of a loading delta that indicates an overall gain or loss that may be realized between the serving base station and the target base station.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or example set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communication system 100, in accordance with various aspects of the present disclosure. The wireless communication system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, a UE 115-*a* may communicate with a serving base station 105-*a* as it moves to the edge of the serving cell 110-*a*. In such an embodiment, the signal strength of the serving base station 105-*a* may deteriorate with respect to its communication with the UE 115-*a* and thus require a handover from the serving base station 105-*a* to a target base station 105-*b*. In the present disclosure, there may be two phases involved in a handover procedure for UEs 115: a preparation phase and an execution phase. In the preparation phase, the UE 115-*a* may send periodic or event-based measurement reports to the serving base station 105-*a*. A handover process may be initiated based on the transmission of the measurement report from the UE 115-*a* to the serving base station 105-*a*. After receiving the measurement reports at the base station 105-*a*, the base station may decide whether to trigger a handover and if so, decide to which target base station the UE 115-*a* should be handed over. Besides the measurement reports, other criteria may also be considered by the serving base station 105-*a* before a control message is sent to the target base station 105-*b* to prepare for the handover. In certain examples of the present disclosure, such criteria may be weight factor values associated with uplink and downlink metrics.

Conventional methods of facilitating a handover have focused solely on initiating a handover process based on the downlink measurement reports including Reference Signal Received Power (RSRP) and/or Reference Signal Received Quality (RSRQ). However, in accordance with the present disclosure, the UEs 115 may transmit measurement reports that include both uplink and downlink metrics to the serving base station 105 to assist the network in handover during the preparation phase. In further examples, once the preparation phase is completed and the serving base station 105-a has determined to trigger a handover based at least in part on the received measurement reports and the weight factors associated with the uplink and downlink metrics, a handover command control message may be sent by the serving base station 105-a to the UE 115-a in the execution phase to notify the UE 115-a that it will be handed over to a target base station 105-b. Upon receiving the message, the UE 115-a may disconnect itself from the serving base station 115-a and request connection with the target base station 105-b.

In other examples, a serving base station 105-a, upon receiving a measurement report comprising uplink and downlink metrics in addition to the weight factors associated with the uplink and downlink metrics, may decide to hold over the triggering of the handover process. In the context of this description, holding over the handover may be preventing, deferring or inhibiting the triggering of the handover process. In addition, holding over the handover process may represent postponing the initiation of the process for a certain period of time. A handover may be triggered after the serving base station has issued a handover command control message to the UE 115 following its determination.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel or component carrier being established between the UE and one of a number of cells (e.g., serving cells, which in some cases may be different base stations 105).

The communication links 125 shown in wireless communication system 100 may include uplink channels (or component carriers) for carrying uplink (UL) communications (e.g., transmissions from a UE 115 to a base station 105) and/or downlink channels (or component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions.

In certain examples of the present disclosure, the downlink channel for carrying DL communications may fade as the UE 115-a moves from the serving cell 110-a to the target cell 110-b. However, in such instances, the uplink channel condition for carrying UL communications may remain unaffected. Alternatively, in another example, the uplink channel may deteriorate, while the downlink channel may remain unaffected. In yet another example of the present disclosure, both the UL and the DL channel conditions may deteriorate. In accordance with the present disclosure, the UE 115-a may transmit to the serving base station 105-a measurement reports that include both uplink and downlink metrics via the communication link 125. The UE 115-a may further transmit to the serving base station weight factors associated with the uplink and downlink metrics. The measurement reports and the associated weight factors may be transmitted to the serving base station 105-a either collectively or separately.

Figure 2:
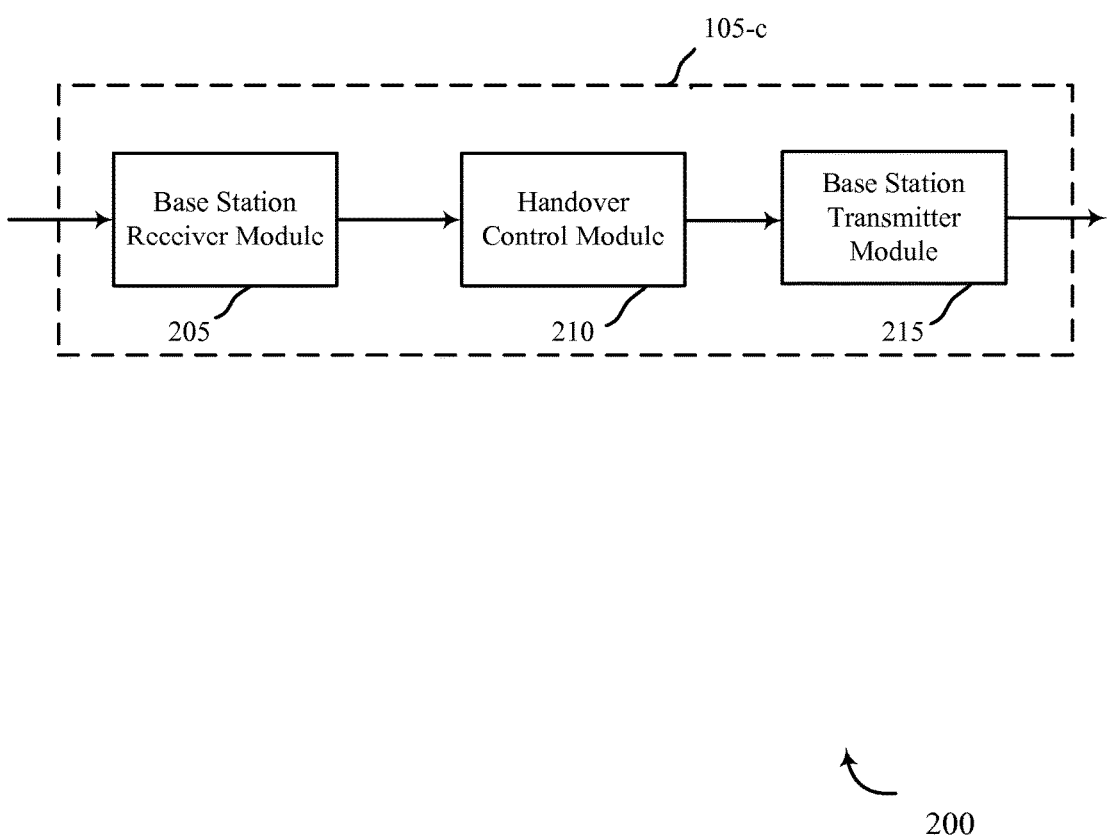
FIG. 2 shows a block diagram of an exemplary wireless communications system of a base station, in accordance with the present disclosure.

FIG. 2 shows a block diagram 200 of an apparatus 105-c for use in wireless communication, in accordance with various aspects of the present disclosure. In some examples, the apparatus 105-c may be an example of aspects of one or more of the base stations 105 described with reference to FIG. 1. The apparatus 105-c may also be a processor. The apparatus 105-c may include a base station receiver module 205, a handover management module 210, and/or a transmitter module 215. Each of these components may be in communication with each other.

The components of the apparatus 105-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 may be used to receive various types of data and/or control signals (i.e., transmissions) over one or more communication links of a wireless communication system, such as one or more communication links 125 of the wireless communication system 100 described with reference to FIG. 1. The receiver module 205 may receive information such as packet, data, and/or signaling information regarding what the device 105-c has received. The received information may be utilized by the handover control module 210 to make a determination as to whether to either trigger or holdover handover process from a serving base station (such as the apparatus 105-c) to a target base station.

The handover control module 210 may be used to control the receipt of wireless communications via the receiver module 205 and/or to control the transmission of wireless communications via the transmitter module 215. Controlling the receipt of wireless communications via the receiver module 205 may include receiving from the user equipment 115 of the wireless communication system 100 described with reference to FIG. 1, measurement reports and weight factors associated with the uplink and downlink metrics. The handover control module 210 may further use the received communication to determine whether to trigger or hold over (e.g., prevent, defer, inhibit, etc.) a handover based in part on the received measurement reports and weight factors associated with the uplink and downlink metrics. In certain example, the handover control module 210 may issue a measurement control message providing the UE 115 with one or more reporting thresholds for measurement reports. In yet another example, the handover control module 210 may issue a handover command control message to a UE 115 to notify the UE that it will be handed over to a target base station.

The base station transmitter module 215 may include at least one RF transmitter. The transmitter module 215 may be used to transmit various types of data and/or control signals (i.e., transmissions) over one or more communication links of a wireless communication system, such as one or more communication links 125 of the wireless communication system 100 described with reference to FIG. 1. The base station transmitter module 215 may transmit information such as packet, data, and/or signaling information regarding what the device 105-c has transmitted. The transmitted information may be utilized by the other base stations 105 or UEs 115 described with reference to FIG. 1.

Figure 3:
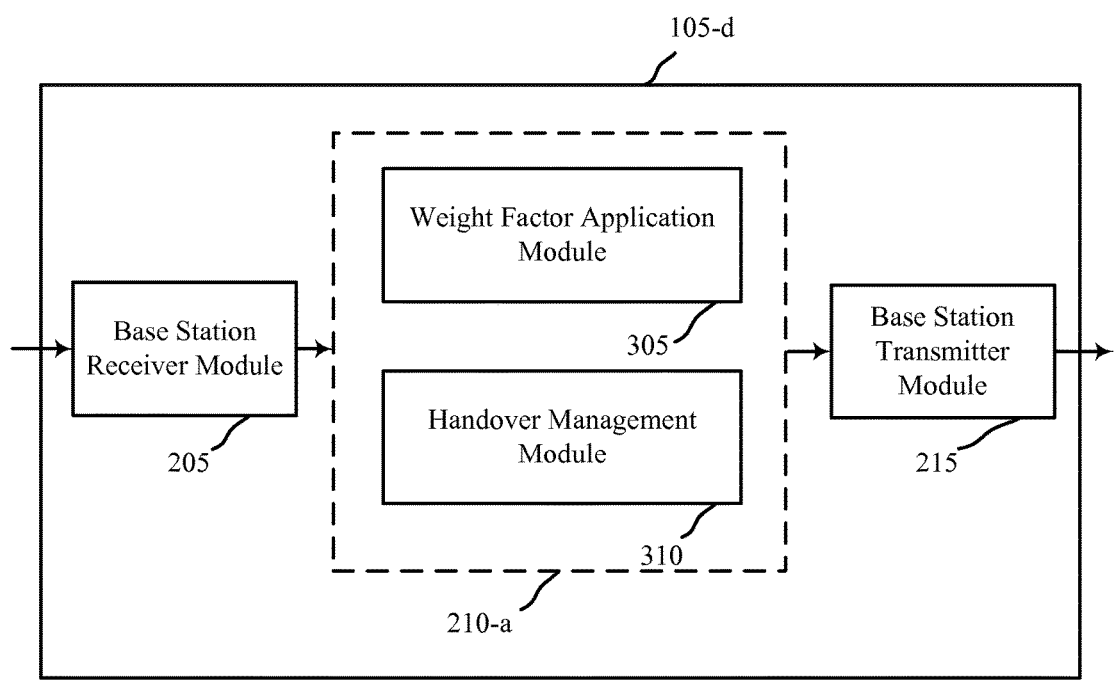
FIG. 3 shows a block diagram of an exemplary wireless communications system of a base station and a handover control module, in accordance with the present disclosure.

FIG. 3 shows a block diagram 300 of an apparatus 105-d for use in wireless communication, in accordance with various aspects of the present disclosure. In some examples, the apparatus 105-d may be an example of aspects of one or more of the base stations 105 described with reference to FIG. 1 and/or FIG. 2. The apparatus 105-d may also be a processor. The apparatus 105-d may include a receiver module 205, a handover control module 210-a, and/or a transmitter module 215. Each of these components may be in communication with each other.

The components of the apparatus 105-d may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the receiver module 205 and transmitter module 215 may operate and function as previously described with reference to FIG. 2. The receiver module 205 may be used to receive various types of data and/or control signals (i.e., transmissions) over one or more communication links of a wireless communication system, such as one or more communication links 125 of the wireless communication system 100 described with reference to FIG. 1. The receiver module 205 may receive information such as packet, data, and/or signaling information regarding what the device 105-d has received. The base station transmitter module 215 may include at least one RF transmitter. The transmitter module 215 may be used to transmit various types of data and/or control signals (i.e., transmissions) over one or more communication links of a wireless communication system, such as one or more communication links 125 of the wireless communication system 100 described with reference to FIG. 1. The base station transmitter module 215 may transmit information such as packet, data, and/or signaling information regarding what the device 105-d has transmitted.

In some examples, the handover control module 210-a may be an example of one or more aspects of the handover control module 210 described with reference to FIG. 2. The handover control module 210-a may include a weight factor application module 305 and a handover management module 310. Each of these components may be in communication with each other. The weight factor application module 305 may receive a plurality of weight factors associated with the uplink and the downlink metrics from the receiver module 205 as described with reference to FIG. 2. The weight factors may be received from a UE 115 as described with reference to FIG. 1. The weight factors may indicate to the apparatus 105-d the relative value that the UE 115 places on its uplink and downlink transmissions, respectively. For example, if the UE 115 is engaged in primarily uplink data transfer (e.g., uploading pictures or video from the mobile device to the network or other UEs) with relatively low downlink transmission, the UE 115 may place greater importance (i.e., a greater weight value) on the uplink transmission as compared to the downlink transmission. In contrast, if the UE 115 is engaged in primarily downlink data transmission (e.g., downloading music or videos to the mobile device), the UE 115 may place greater weight factor value on the downlink transmission as compared to the uplink transmission. The weight factor application module 305 may apply the plurality of received weight factors to the received uplink and downlink metrics received at the receiver module 205 from the UE 115. The measurement reports and associated weight factors may be received at the base station 105-d either as a single transmission or multiple transmissions.

In another example, the handover management module 310 may determine to either trigger or hold over the handover process based in part on the information received by the weight factor application module 305. Alternatively, in some examples, the handover management module 310 may determine to trigger or hold over the handover process solely on the received measurement reports of the uplink and the downlink metrics without applying the weight factors associated with the uplink and downlink metrics. In certain examples, the handover management module 310 may issue a command notifying the UE 115 or a neighbor base station (e.g., a target base station) of the decision to hold over or trigger the handover process.

Figure 4:
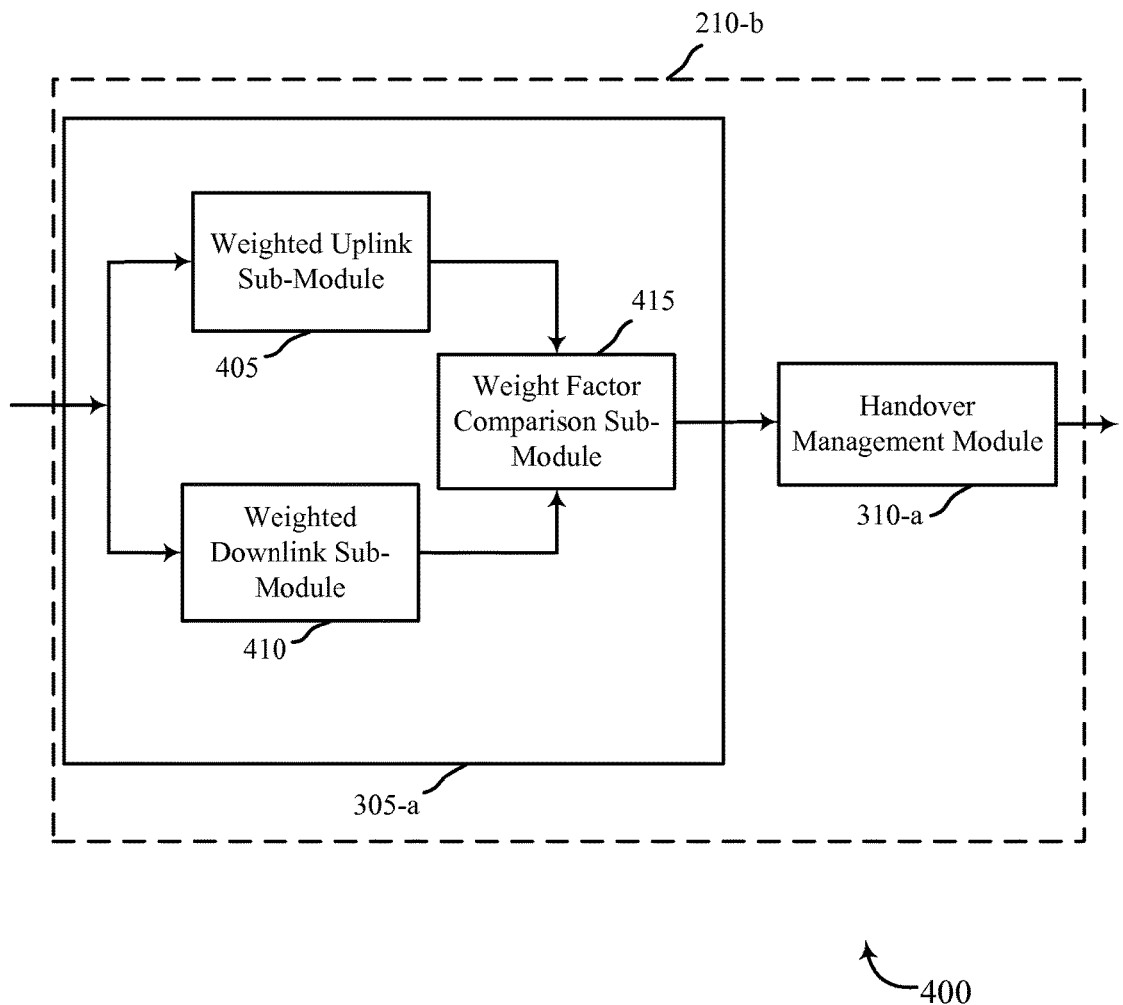
FIG. 4 shows a block diagram of an exemplary weight factor application module in communication with handover management module, in accordance with the present disclosure.

FIG. 4 shows a block diagram 400 of an apparatus 210-b for use in a wireless communication, in accordance with various aspects of the present disclosure. In some examples, the apparatus 210-b may be an example of aspects of handover control module 210 described with reference to FIG. 2 and/or FIG. 3. The apparatus 210-b may also be a processor. The apparatus 210-b may include a weight factor application module 305-a and/or a handover management module 310-a. Each of these components may be in communication with each other.

The components of the apparatus 210-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-custom ICs), which may be programmed in any manner known in the art. The functions of each unit may also be implemented, in whole or in part, with instructions embodied in a memory, formatted to be executed by one or more general or application-specific processors.

In some examples, the weight factor application module 305-a may be an example of one or more aspects of the weight factor application module 305 described with reference to FIG. 3. The weight factor application module 305-a may include a weighted uplink sub-module 405, a weighted downlink sub-module 410 and a weight factor comparison sub-module 415. Each of these components may be in communication with each other. The weight factor application module 305-a may receive a plurality of weight factors associated with the uplink and downlink metrics, respectively. As was discussed with reference to FIG. 2, the weight factors may indicate to a serving base station 105 the relative value that a UE 115 places on the uplink and downlink transmissions. For example, if a UE 115 is engaged in primarily uplink data transfer (e.g., uploading pictures or video from the mobile device to the network or other UEs) with relatively low downlink transmission, the UE 115 may place a greater weight factor value on the uplink transmission as compared to the downlink transmission. In contrast, if a UE 115 is engaged in primarily downlink data transmission (e.g., downloading music or videos to the mobile device), the UE 115 may place greater weight factor value on the downlink transmission as compared to the uplink transmission. The weight factor application module 305-a may apply a plurality of received weight factors to the received uplink and downlink metrics.

Some embodiments may utilize the weighted uplink sub-module 405 and weighted downlink sub-module 410 to apply the plurality of received weight factors to the uplink and downlink metrics, respectively, to generate a weighted uplink metric and a weighted downlink metric. The weighted uplink metric and the weighted downlink metric may be subsequently fed into the weight factor comparison sub-module 415, which the weighted metrics to determine whether the weighted uplink metric is greater than the weighted downlink metric. The output of the weight factor comparison sub-module 415 may be provided to the handover management module 310-a. The handover management module 310-a may be an example of aspects the handover management module 310 described with reference to FIG. 3. The handover management module 310-a may then use the information provided by the weight factor comparison sub-module 415 to trigger, hold over, prevent, inhibit, defer etc. the handover process, as will be described in more detail below.

Figure 5:
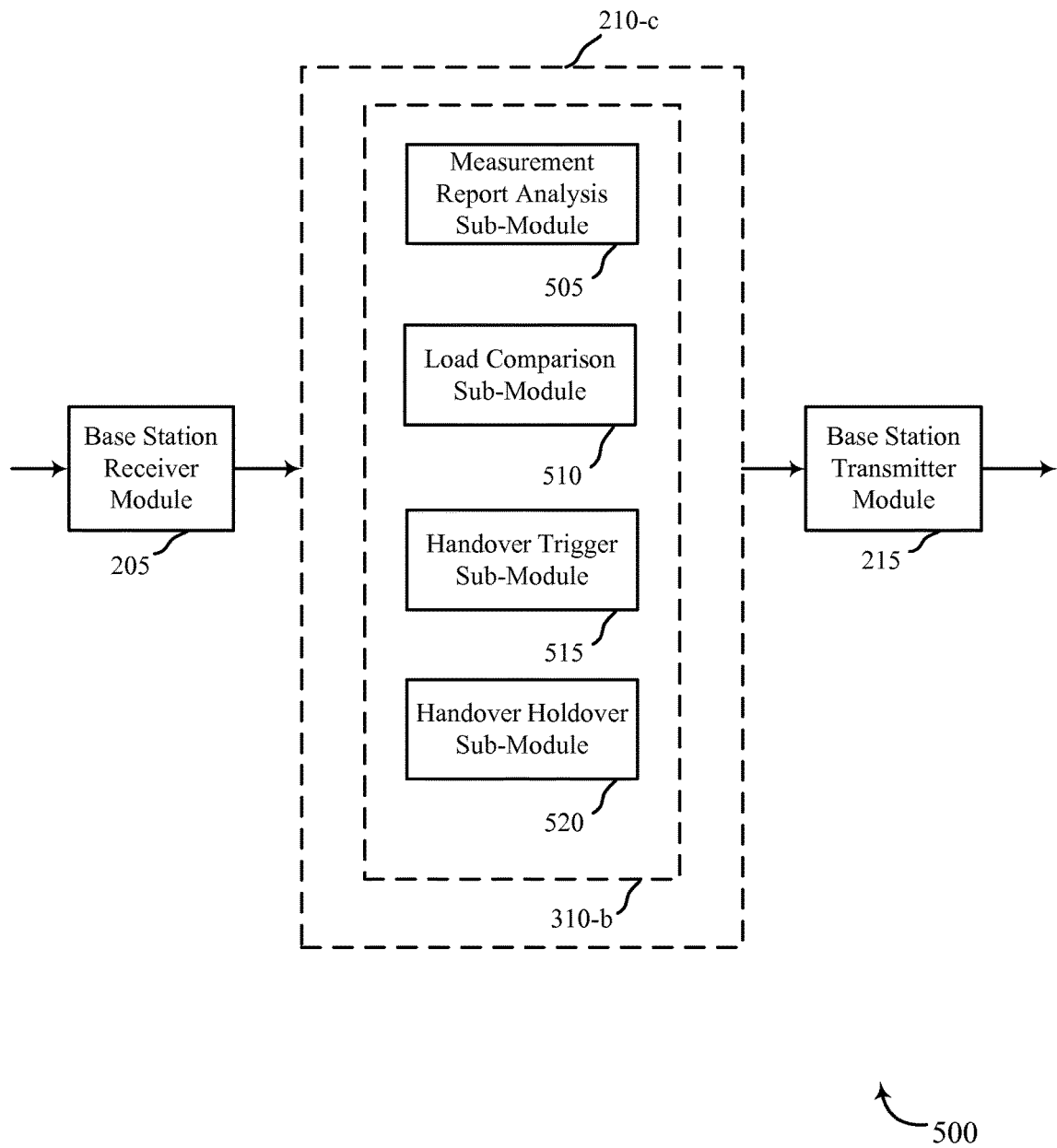
FIG. 5 shows a block diagram of a handover management module, in accordance with the present disclosure.

FIG. 5 shows a block diagram 500 of an apparatus 210-c for use in a wireless communication, in accordance with various aspects of the present disclosure. In some examples, the apparatus 210-c may be an example of aspects of the handover control module 210 illustrated in FIGS. 1, 2, 3, and/or 4. The apparatus 210-c may be in communication with a base station receiver module 205 and a transmitter module 215. Each of these components may be in communication with each other. The apparatus 210-c may be a processor.

In one embodiment, the apparatus 210-c may include a handover management module 310-b. In some examples, the handover management module 310-b may be an example of aspects of one or more of the handover management module 310 described with reference to FIGS. 3 and/or 4. The handover management module 310-b may include a measurement report analysis sub-module 505, a load comparison sub-module 510, a handover trigger sub-module 515, and a handover holdover sub-module 520. Each of these components may be in communication with each other.

The components of the apparatus 210-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the base station receiver module 205 and base station transmitter module 215 may operate and function as previously described with reference to FIG. 2 and/or FIG. 3. In some examples, the measurement report analysis sub-module 505 may retrieve and analyze measurement reports associated with the uplink and downlink metrics during a handover preparation phase. The measurement reports may include a downlink and uplink metrics such as reference signal received power (RSRP), reference signal received quality (RSRQ), power heardroom report (PHR), buffer status report (BHR), Rise over Thermal (RoT) and Physical Resource Block (PRB) reports associated with the serving base station 105-a and a neighbor base stations 105.

In some examples, a load comparison sub-module 510 may calculate a downlink and uplink loading delta ($\Delta$) that indicates an overall gain or loss that may be realized for a user experience when a handover is triggered from the serving base station 105-a to the target base station 105-b based in part on the measurement report analysis provided by the measurement report analysis sub-module 505. The handover management module 310-b may determine whether to trigger a handover process or hold over the handover process in view of both the uplink and downlink metrics.

In some examples, a handover trigger sub-module 515 may trigger or initiate a handover process if a UE 115 would realize an overall gain by transferring communication from the serving base station 105-*a* to a target base station 105-*b* as previously described in FIG. 1. In one example, the handover trigger sub-module 515 may trigger a previously initiated handover process. The previously initiated handover process may have been initiated based on a downlink RSRP and/or RSRQ trigger received at the serving base station 105-*a*. In yet another example, the handover trigger sub-module 515 may either initiate or trigger a handover based in part on both the uplink and downlink metrics. The handover trigger sub-module 515, following a determination that the uplink user experience would not be negatively impacted and/or the UE 115 would realize an overall gain based on the calculated loading delta ($\Delta$), may trigger a handover process by issuing a handover command control message to the UE 115 in the execution phase of the handover process. The handover command may notify the UE 115 that it will be handed over to a target base station 105-*b*. The handover trigger sub-module 515 may further issue a control message to the target base station 105-*b* notifying the target base station 105-*b* to prepare for a handover.

In another example, a handover holdover sub-module 520 may defer, prevent, inhibit or stop a handover process from being triggered based in part on the measurement report analysis, downlink and uplink loading delta ($\Delta$) and weight factors associated with the uplink and downlink metrics. In some embodiments, the length of hold over may be based on a predetermined timer or events. Examples of such events may include, but are not limited to, receiving, at the serving base station, updated measurement reports and weight factors associated with the uplink and downlink metrics. At the expiration of the predetermined timer or upon receiving updated measurement reports and weight factors associated with the uplink and downlink metrics, the measurement report analysis sub-module 505 and load comparison sub-module 510 may reevaluate whether to initiate, trigger or holdover the handover from a serving base station 105-*a* to a target base station 105-*b*. In certain examples, the predetermined timer may be indefinite. In some embodiments, when the handover process is held over, prevented, deferred or inhibited, the UE 115 may maintain communications with the serving base station 105 until the handover trigger sub-module 515 triggers the handover process. This trigger may be based on an updated measurement report and weight factors received at the handover control module 210-*c*.

Figure 6:
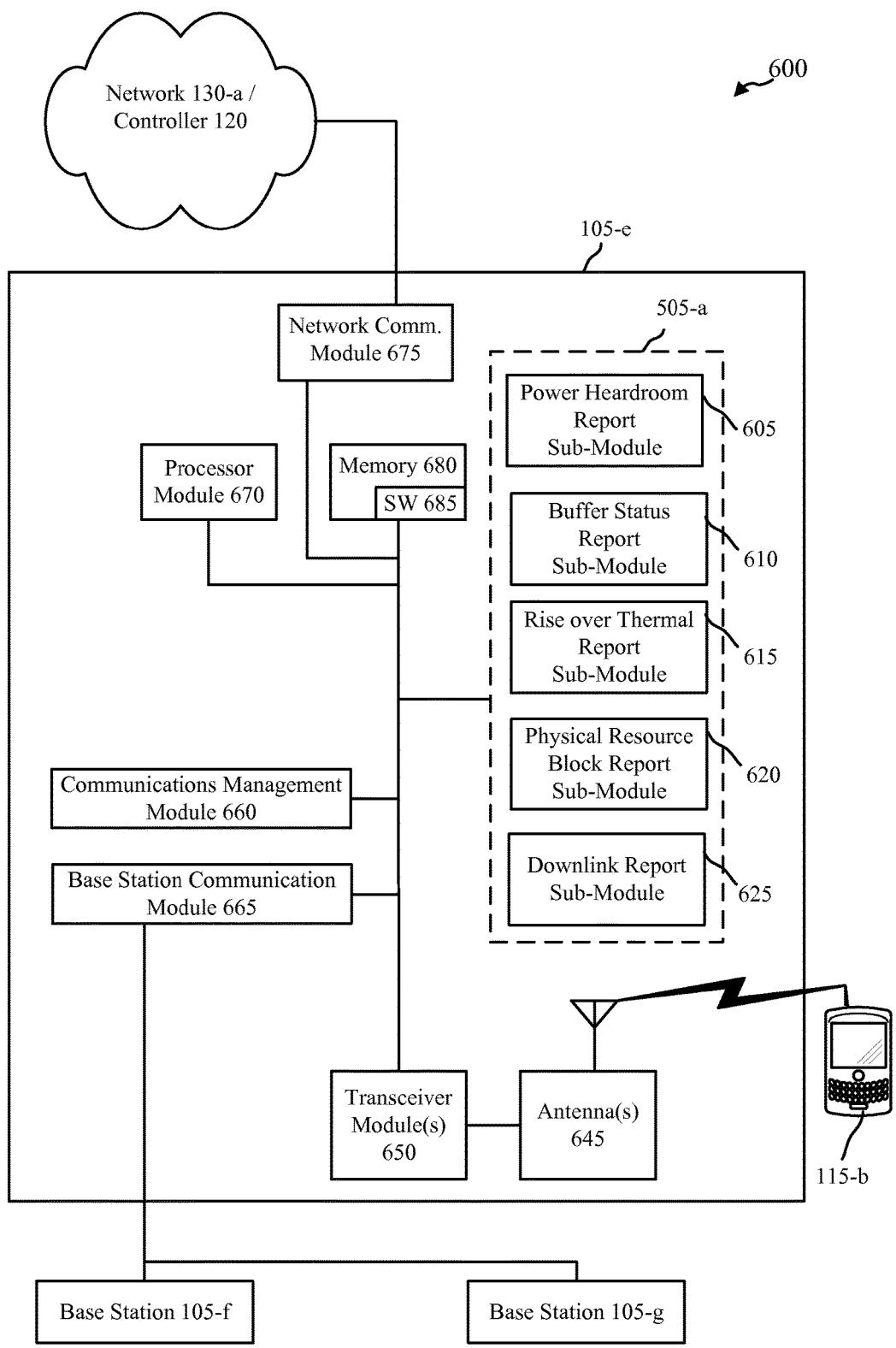
FIG. 6 show an example of a base station, in accordance with the present disclosure.

FIG. 6 shows a block diagram of a communications system 600 for use in wireless communications, in accordance with various aspects of the present disclosure. This system 600 may be an example of aspects of the system 100 depicted in FIG. 1. The system 600 may include a base station 105-*e*. The base station 105-*e* may be an example of the base station 105 described with reference to FIGS. 1, 2, and/or 3. The base station 105-*e* may include antenna(s) 645, a transceiver module 650, memory 680, and a processor module 670, which each may be in communication, directly or indirectly, with each other (e.g., over one or more buses). The transceiver module 650 may be configured to communicate bi-directionally, via the antenna(s) 645, with a UE 115-*b*, which may be an example of the UE 115 described with reference to FIG. 1.

The transceiver module 650 (and/or other components of the base station 105-*e*) may also be configured to communicate bi-directionally with one or more networks. In some cases, the base station 105-*e* may communicate with the core network 130-*a* and/or controller 120 through network communications module 675. Base station 105-*e* may be an example of an eNodeB base station, a Home eNodeB base station, a NodeB base station, and/or a Home NodeB base station. Controller 120 may be integrated into base station 105-*e* in some cases, such as with an eNodeB base station.

Base station 105-*e* may also communicate with other base stations 105, such as base station 105-*f* and base station 105-*g*. Each of the base stations 105 may communicate with UEs 115 using different wireless communications technologies, such as different Radio Access Technologies. In some cases, base station 105-*e* may communicate with other base stations such as 105-*f* and/or 105-*g* utilizing base station communication module 665. In some embodiments, base station communication module 665 may provide an X2 interface within an LTE wireless communication technology to provide communication between some of the base stations 105. In some embodiments, base station 105-*e* may communicate with other base stations through controller 120 and/or core network 130-*a*.

The memory 680 may include random access memory (RAM) and read-only memory (ROM). The memory 680 may also store computer-readable, computer-executable software code 685 containing instructions that are configured to, when executed, cause the processor module 670 to perform various functions described herein (e.g., call processing, database management, message routing, etc.). Alternatively, the software code 685 may not be directly executable by the processor module 670 but be configured to cause the computer, e.g., when compiled and executed, to perform functions described herein.

The processor module 670 may include an intelligent hardware device, e.g., a central processing unit (CPU), a microcontroller, an application-specific integrated circuit (ASIC), etc. The processor module 670 may include a speech encoder (not shown) configured to receive audio via a microphone, convert the audio into packets (e.g., 30 ms in length, etc.) representative of the received audio, provide the audio packets to the transceiver module 650, and provide indications of whether a user is speaking. Alternatively, an encoder may only provide packets to the transceiver module 650, with the provision or withholding/suppression of the packet itself providing the indication of whether a user is speaking.

In some embodiments, the base station 105-*e* may further include a measurement report analysis module 505-*a* that includes a power headroom report sub-module 605, a buffer status report sub-module 610, a rise over thermal report sub-module 615, a physical resource block report sub-module 620 and a downlink report sub-module 625. Each of these components may be in communication with each other. In some examples, the measurement report analysis module 505-*a* may be an example of aspects of one or more of the measurement report analysis module 505 described with reference to FIG. 5.

The components of the module 505-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the power headroom report sub-module 605 may receive and process measurement reports including power headroom reports (PHR) that indicate an amount of transmission power a UE 115 may have remaining for data transmission. Reception and processing of successive negative PHR index by the power headroom report sub-module 605 may indicate a lack of transmission power remaining for the UEs 115. In contrast, processing positive PHR indexes may indicate sufficient remaining transmission power headroom for the UEs 115. Therefore, the power headroom report sub-module 605 processes the received measurement PHR reports to estimate an amount of uplink bandwidth that a UE 115 may have remaining for subsequent data transfers.

In another example, the buffer status report (BSR) sub-module 610 may receive and process measurement reports indicating index values that represent an amount of data remaining to be transmitted from the UE 115 to the serving base station 105-a. A higher BSR index value may represent that a transmission buffer of the UE 115 has data remaining to be transmitted to the base station 105. In contrast, a low index value may represent a lack of data remaining to be transmitted from the UE 115 to the serving base station 105-a.

In yet another example, the Rise over Thermal (RoT) report sub-module 615 may process measurement reports including the ratio between the total interference received at a base station 105 and the thermal noise. In some embodiments, the RoT report sub-module 615 may measure relative congestion at the serving base station 105-a in comparison with the congestion at the target base station 105-b. In another example, a Physical Resource Block (PRB) report sub-module 620 may process measurement reports associated with the uplink and downlink metrics including determining the percentage of allocated physical resource blocks for the UEs 115.

In some embodiments, a downlink report sub-module 625 may process measurement reports associated with the downlink metrics including RSRP and/or RSRQ metrics that provide an indication of downlink channel conditions between a UE 115 and a serving base station 105. In some embodiments, the downlink report sub-module may process event based triggers when the UE 115 moves from a serving cell 110-a towards a target cell 110-b (as described in FIG. 1) and the downlink channel conditions deteriorate.

The transceiver module 650 may include a modem configured to modulate the packets and provide the modulated packets to the antenna(s) 645 for transmission, and to demodulate packets received from the antenna(s) 645. While some examples of the base station 105-e may include a single antenna 645, the base station 105-e preferably includes multiple antennas 645 for multiple links which may support carrier aggregation. For example, one or more links may be used to support macro communications with mobile device 115-b.

According to the architecture of FIG. 6, the base station 105-e may further include a communications management module 660. The communications management module 660 may manage communications with other base stations 105. By way of example, the communications management module 660 may be a component of the base station 105-h in communication with some or all of the other components of the base station 105-e via a bus. Alternatively, functionality of the communications management module 660 may be implemented as a component of the transceiver module 650, as a computer program product, and/or as one or more controller elements of the processor module 670.

The components for base station 105-e may be configured to implement aspects discussed above with respect to the handover control module 210 of FIG. 2 or the weight factor application module 305 of FIG. 3 and may not be repeated here for the sake of brevity.

In some embodiments, the transceiver module 650 in conjunction with antenna(s) 645, along with other possible components of base station 105-e, may operate and function as previously described base station receiver module 205 and base station transmitter module 215 with reference to FIGS. 2, 3, and/or 5. In some embodiments, the transceiver module 650 in conjunction with antenna(s) 645, along with other possible components of base station 105-e, may transmit information to the measurement report analysis sub-module 505-a, to other base stations 105-f/105-g, or core network 130-a, such as measurement reports associated with uplink and downlink data and received weight factors.

Figure 7:
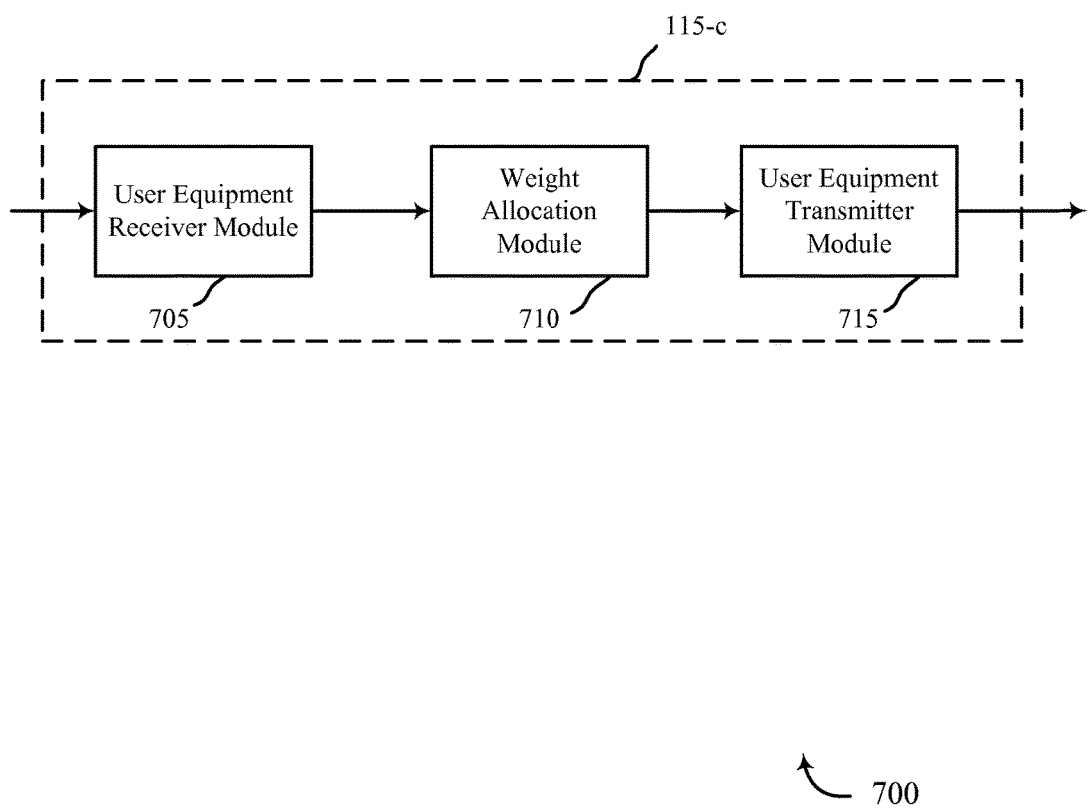
FIG. 7 shows a block diagram of an exemplary wireless communications system of a user equipment, in accordance with the present disclosure.

FIG. 7 shows a block diagram 700 of an apparatus 115-c for use in wireless communication, in accordance with various aspects of the present disclosure. In some examples, the apparatus 115-c may be an example of aspects of one or more of the UEs 115 described with reference to FIGS. 1 and/or 6. The apparatus 115-c may also be a processor. The apparatus 115-c may include a UE receiver module 705, a weight allocation module 710, and/or a UE transmitter module 715. Each of these components may be in communication with each other.

The components of the apparatus 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 705 may be used to receive various types of data and/or control signals (i.e., transmissions) over one or more communication links of a wireless communication system, such as one or more communication links 125 of the wireless communication system 100 described with reference to FIG. 1. The receiver module 705 may receive information such as packet, data, and/or signaling information regarding what the device 115-c has received including measurement control message transmitted by the base station 105 providing the UE with one or more reporting thresholds. The receiver module 705 may also further comprise establishing a downlink channel with the base station and receiving packets, data and/or signaling information on the established downlink channel. The received information may be utilized by the weight allocation module 710 to prepare measurement reports, allocate weight factors to uplink and downlink metrics and forward the measurement reports and allocated weight factors to the user equipment transmitter module 715 to transmit to the base station 105, such as the serving base station 105-a.

The weight allocation module 710 may be used to allocate index values to the uplink and downlink transmission based on the UE 115 specific usage. For instance, if a user of the UE 115 is engaged in an uplink focused application (e.g., uploading pictures or videos from the UE), the weight allocation module 710 may specify greater index value weights for the uplink transmission. Conversely, if a user of the UE 115 is engaged in downlink focused application (e.g., downloading or streaming music and/or videos), the weight allocation module 710 specify greater index value weight for the downlink transmission compared to the uplink transmission. In yet a further example, if the UE 115 is utilizing uplink and downlink data relatively evenly, the weight allocation module 710 may assign relatively equal index value weights to both uplink and downlink transmissions.

The UE transmitter module 715 may include at least one RF transmitter. The transmitter module 715 may be used to transmit various types of data and/or control signals (i.e., transmissions) over one or more communication links of a wireless communication system, such as one or more communication links 125 of the wireless communication system 100 described with reference to FIG. 1. The UE transmitter module 715 may transmit information such as packet, data, and/or signaling information regarding what the device 115-c has transmitted. The transmitted information may be utilized by the base stations 105 or other UEs 115 is facilitating a handover process described with reference to FIG. 1.

Figure 8A:
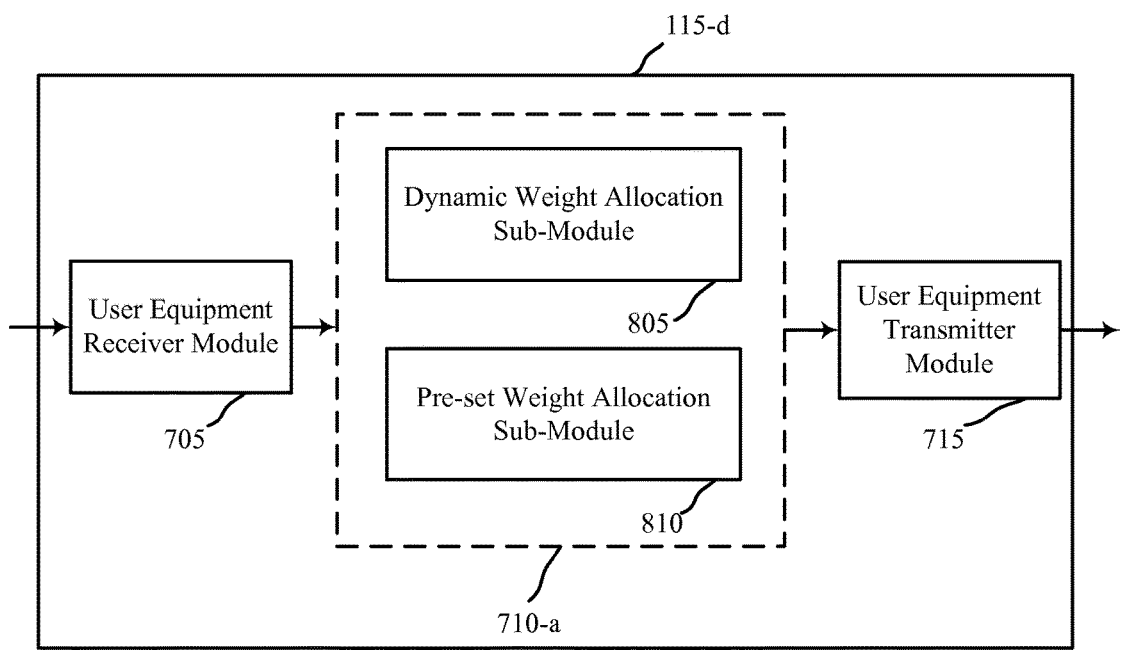
FIG. 8A shows a block diagram of an exemplary wireless communications system of a user equipment including corresponding weight allocation module, in accordance with the present disclosure.

FIG. 8A shows a block diagram 800 of an apparatus 115-d for use in wireless communication, in accordance with various aspects of the present disclosure. In some examples, the apparatus 115-d may be an example of aspects of one or more of the UE 115 described with reference to FIGS. 1, 6, and/or 7. The apparatus 115-d may also be a processor. The apparatus 115-d may include a user equipment receiver module 705, a weight factor allocation module 710-a, and/or a transmitter module 715. Each of these components may be in communication with each other.

The components of the apparatus 115-d may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the user equipment receiver module 705 and user equipment transmitter module 715 may operate and function as previously described with reference to FIG. 7. The weight allocation module 710-a may further include a dynamic weight allocation sub-module 805 and a pre-set weight allocation sub-module 810. The dynamic weight allocation sub-module 805 may allow the user to define relative index values for the weight factors associated with the uplink and downlink transmission. A user may specify index values for the uplink and downlink transmission using a user interface configured at the UE 115 based on user's personal preference. The user-defined weight factors associated with the uplink and downlink metrics may be forwarded to the user equipment transmitter module 715 for transmission to the serving base station 105. Alternatively, the dynamic weight allocation sub-module may dynamically adjust the weight factors associated with the uplink and the downlink metrics based in part on the monitored user activity on the UE 115. The weight allocation module 710-a may further include pre-set weight allocation sub-module 810 that allows weight factors associated with the uplink and downlink transmission to be predetermined and set in the UE memory for transmission to the base station 115.

Figure 8B:
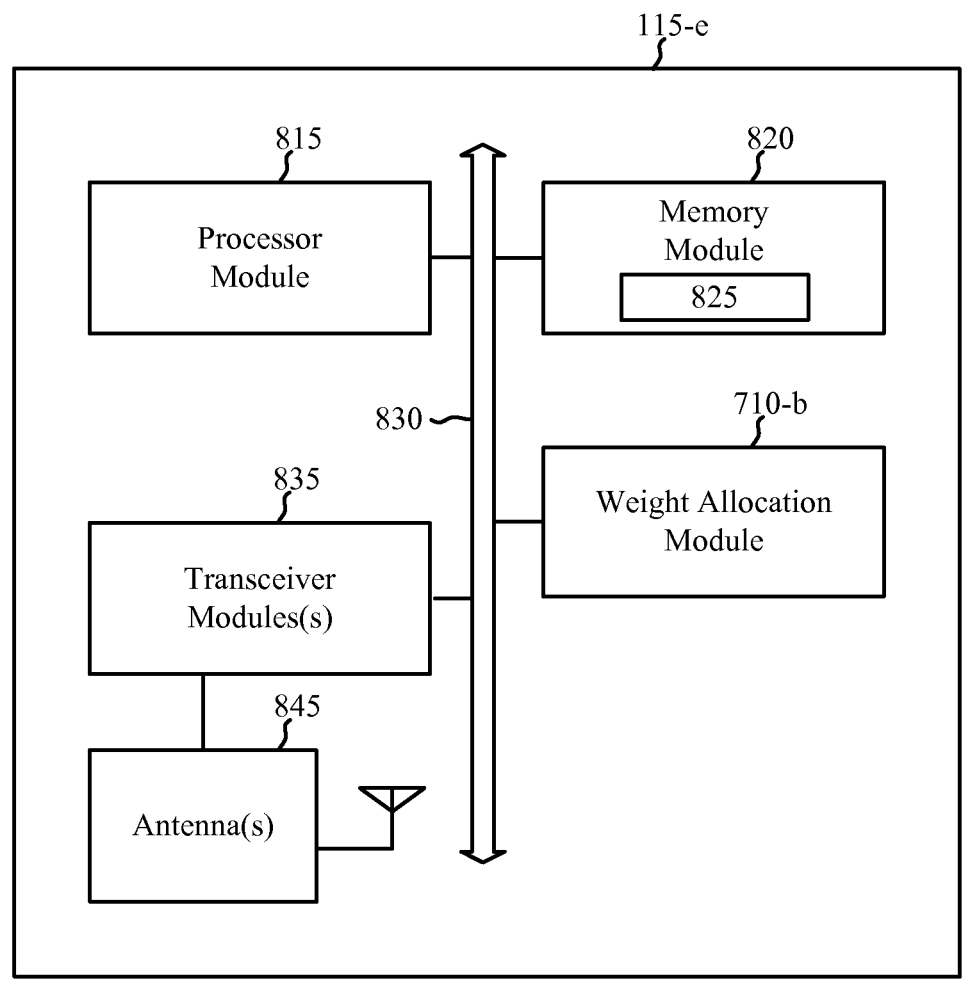
FIG. 8B shows a block diagram of an exemplary user equipment, in accordance with aspects of the present disclosure.

FIG. 8B shows a block diagram 850 of a user equipment 115-e, in accordance with various aspects of the present disclosure. The mobile device 115-e may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The equipment 115-e may in some cases have an internal power supply (not shown), such as a small battery, to facilitate mobile operation. In some embodiments, the UE 115-e may be an example of one or more aspects of one of the UEs 115 described with reference to the previous figures. The UE 115-e may be configured to implement at least some of the features and functions described with reference to the previous figures. The mobile device 115-e may be configured to communicate with one or more of the base stations 105 described with reference to the previous figures.

The mobile device 115-e may include a processor module 815, a memory module 820, at least one transceiver module (represented by transceiver module(s) 835), at least one antenna (represented by antenna(s) 845), and a weight allocation module 710-b. Each of these components may be in communication with each other, directly or indirectly, over one or more buses 830.

The memory module 820 may include random access memory (RAM) and/or read-only memory (ROM). The memory module 820 may store computer-readable, computer-executable software (SW) code 825 containing instructions that are configured to, when executed, cause the processor module 815 to perform various functions described herein for determining weights for uplink and downlink metrics. Alternatively, the software code 825 may not be directly executable by the processor module 815 but be configured to cause the UE 115-e (e.g., when compiled and executed) to perform various of the functions described herein.

The processor module 815 may include an intelligent hardware device, e.g., a CPU, a microcontroller, an ASIC, etc. The processor module 815 may process information received through the transceiver module(s) 835 and/or information to be sent to the transceiver module(s) 835 for transmission via the antenna(s) 845. The processor module 815 may handle, alone or in connection with the weight allocation module 710-b, various aspects of determining and assigning weights to various uplink and downlink metrics in a wireless communication system.

The transceiver module(s) 835 may include a modem configured to modulate packets and provide the modulated packets to the antenna(s) 845 for transmission, and to demodulate packets received from the antenna(s) 845. The transceiver module(s) 835 may in some cases be implemented as one or more transmitter modules and one or more separate receiver modules. The transceiver module(s) 835 may be configured to communicate bi-directionally, via the antenna(s) 845, with one or more base stations 105 or other devices. While the UE 115-e may include a single antenna, there may be embodiments in which the UE 115-e may include multiple antennas 845.

The weight allocation module 710-b may be configured to perform and/or control some or all of the modules described with reference to FIGS. 7 and/or 8A. The weight allocation module 710-b, or portions of it, may include a processor, and/or some or all of the functionality of the weight allocation module 710-b may be performed by the processor module 815 and/or in connection with the processor module 815.

Figure 9:
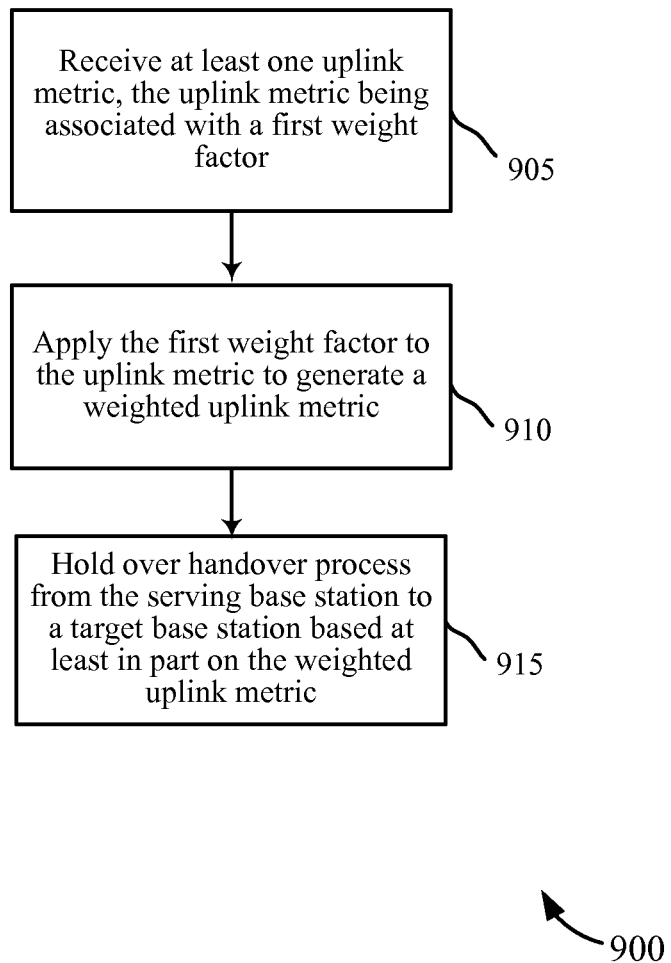
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the base stations 105 described with reference to FIGS. 1, 2, and/or 6. In some examples, a base station may execute one or more sets of codes to control the functional elements of the base station to perform the functions described below.

At block 905, the method 900 may include receiving, at a serving base station, at least one uplink metric. The uplink metric may be associated with a first weight factor. The operation(s) at block 905 may be performed using the base station receiver module 205 described with reference to FIGS. 2, 3 and/or 5 and/or the handover control module 210 described with reference to FIGS. 2, 3, 4 and/or 5.

At block 910, the method 900 may include applying the first weight factor to the uplink metric to generate a weighted uplink metric. The operation(s) at block 910 may be performed using the handover control module 210 described with reference to FIGS. 2, 3, 4 and/or 5 and/or the weight factor application module 305 described with reference to FIGS. 3, and/or 4.

At block 915, the method 900 may include holding over a handover process from the serving base station 105-a to a target base station 105-b based at least in part on the weighted uplink metric. The operation(s) at block 910 may be performed using the handover control module 210 described with reference to FIGS. 2, 3, 4 and/or 5 and/or the handover management module 310 described with reference to FIGS. 2, 3, 4 and/or 5. The operations(s) at block 910 may also be performed by handover holdover sub-module 520 as described with reference to FIG. 5.

In some examples of the method 900, the serving base station 105-a may further receive at least one downlink metric, the downlink metric being associated with a second weight factor. The weight factor application module 305, weighted uplink sub-module 405 and/or weighted downlink sub-module 410 as described with reference to FIGS. 3 and/or 4 may further apply the second weight factor to the downlink metric to generate a weighted downlink metric. In certain examples, the serving base station 105-a may initiate the handover process from the serving base station 105-a to the target base station 105-b based at least in part on a comparison of the weighted downlink metric and the weighted uplink metric. The operation(s) of initiating handover may be performed using handover trigger sub-module 515 as described with reference to FIG. 5.

In some examples of the method 900, uplink metrics may comprise at least one of power headroom report (PHR), a buffer status report (BSR), a Rise over Thermal (RoT) report and a Physical Resource Block (PRB) load report. In another example of method 900, preventing a handover process may comprise determining that the serving base station has received successive negative PHRs and that the BSR indicates non-empty buffer. The operation(s) of determining whether to prevent a handover process may be performed by handover management module 310 described with reference to FIGS. 2, 3, 4 and/or 5.

In some examples of the method 900, the method may comprise requesting a reference signal receive power (RSRP) report for the serving base station and at least one neighbor base station based at least in part on the received PHR and BSR. In response to the request, the method may comprise receiving a RSRP report for the serving base station and at least one neighbor base station from the UE. The handover control module 210 as described with reference in FIGS. 2, 3, 4 and/or 5 may further sort neighbor physical cell (PCIs) in descending order of the received RSRP report.

In other examples of the method 900, the holding over the handover process may comprise determining whether the serving cell RoT is greater than a target cell RoT. In yet another example, the determination may be based on determining that a target cell uplink PRB load is less than a serving cell uplink PRB load. In yet further example, the serving base station may receive a downlink metric and the handover control module 210 as described with reference in FIGS. 2, 3, 4 and/or 5 load comparison sub-module 510 as described with reference in FIG. 5 may calculate an uplink and downlink loading delta ($\Delta$). The loading delta ($\Delta$) may indicate an overall gain or loss between the serving base station and the target base station. The loading delta may further be based at least in part on both the uplink and downlink metrics. The handover management module 310 as described with reference to FIGS. 3, 4 and/or 5 may determine based in part on the loading delta to hold over the handover process if a net loss would be realized by handing over UE communication from the serving base station to the target base station. Conversely, the handover management module 310 may either initiate or trigger the handover process upon determining that a net gain would be realized based in part on the loading delta.

In other examples of the method 900, the serving base station 105-a as described with reference to FIG. 1 may hold over the handover process after a handover event trigger has occurred, wherein the handover event trigger was based at least in part on one of a reference signal receive (RSRP) metric or a reference signal receive quality (RSRQ) metric. In yet another example, the serving base station 105-a may hold over the handover process prior to an occurrence of a handover event trigger, the handover event trigger being based at least in part on one of a RSRP or RSRQ metric. In further examples of the method 900, received first and second weight factors may provide index values that defined relative importance of an uplink and downlink data transfer for a UE respectively. The weight factors may be either user-defined, dynamically adjusted or preset at either the UE or the base station.

Thus, the method 900 may provide for wireless communication. It should be noted that the method 900 is just one implementation and that the operations of the method 900 may be rearranged or otherwise modified such that other implementations are possible.

Figure 10:
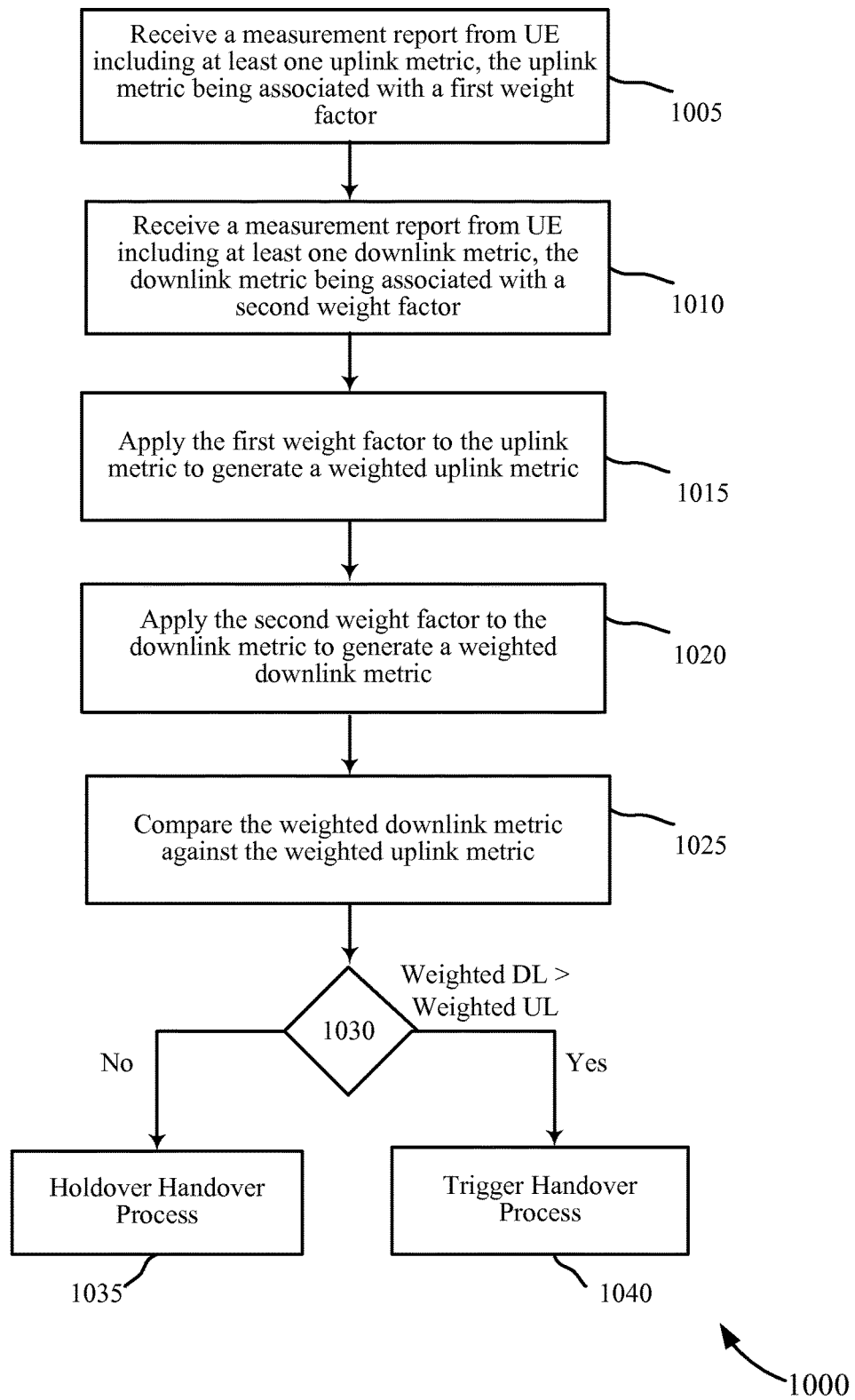
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the base stations 105 described with reference to FIGS. 1, 2, 3, and/or 6. In some examples, a base stations such as one of the base stations 105 may execute one or more sets of codes to control the functional elements of the base station to perform the functions described below.

At block 1005, the method 1000 may include receiving, at a serving base station, measurement reports from the UE including at least one uplink metric. The uplink metrics may be associated with a first weight factor. The operation(s) at block 1005 may be performed by the base station receiver module 205 as described with reference to FIGS. 2, 3 and/or 5. At block 1010, the serving base station may receive a measurement report from UE including at least one downlink metric. The downlink metric may be associated with a second weight factor. The operation(s) at block 1010 may also be performed by the base station receiver module 205 as described with reference to FIGS. 2, 3 and/or 5.

At block 1015, the method 1000 may include applying the first weight factor to the uplink metric to generate a weighted uplink metric. The operation(s) at block 1015 may be performed more specifically by the weighted uplink sub-module 405 as described with reference to FIG. 4. At block 1020, the method 1000 may include applying the second weight factor to the downlink metric to generate a weighted downlink metric. The operation(s) at block 1020 may be performed more specifically by the weighted downlink sub-module 410 as described with reference to FIG. 4.

At block 1025, the method 1000 may include comparing the weighted downlink metric against the weighted uplink metric. The operation(s) at block 1025 may be performed more specifically by the weight factor comparison sub-module 415 as described with reference to FIG. 4. At block 1030, the method 1000 may include determining whether the weighted downlink metric has greater value than the weighted uplink metric. In one example, the UE may place higher value on its uplink data transmission in comparison to the downlink metric. In yet another example, the UE may place higher value on its downlink data transmission in comparison to the uplink metric. In yet another example, the UE may place equal value on both the downlink and uplink metric. The operation(s) at block 1030 may be performed more specifically by the handover management module 310 as described with reference to FIGS. 3, 4 and/or 5.

At block 1035, the method 1000 may include holding over handover process based at least in part on determining that the weighted uplink metric has greater value for a particular UE than the weighted downlink metric. The operation(s) at block 1035 may be performed more specifically by the handover holdover sub-module 520 as described with reference to FIG. 5. Conversely, at block 1040, the method 1000 may include triggering the handover process when it is determined that the weighted downlink metric has greater value for a particular UE than the weighted uplink metric. The operation(s) at block 1040 may be performed more specifically by the handover trigger sub-module 515 as described with reference to FIG. 5.

Figure 11:
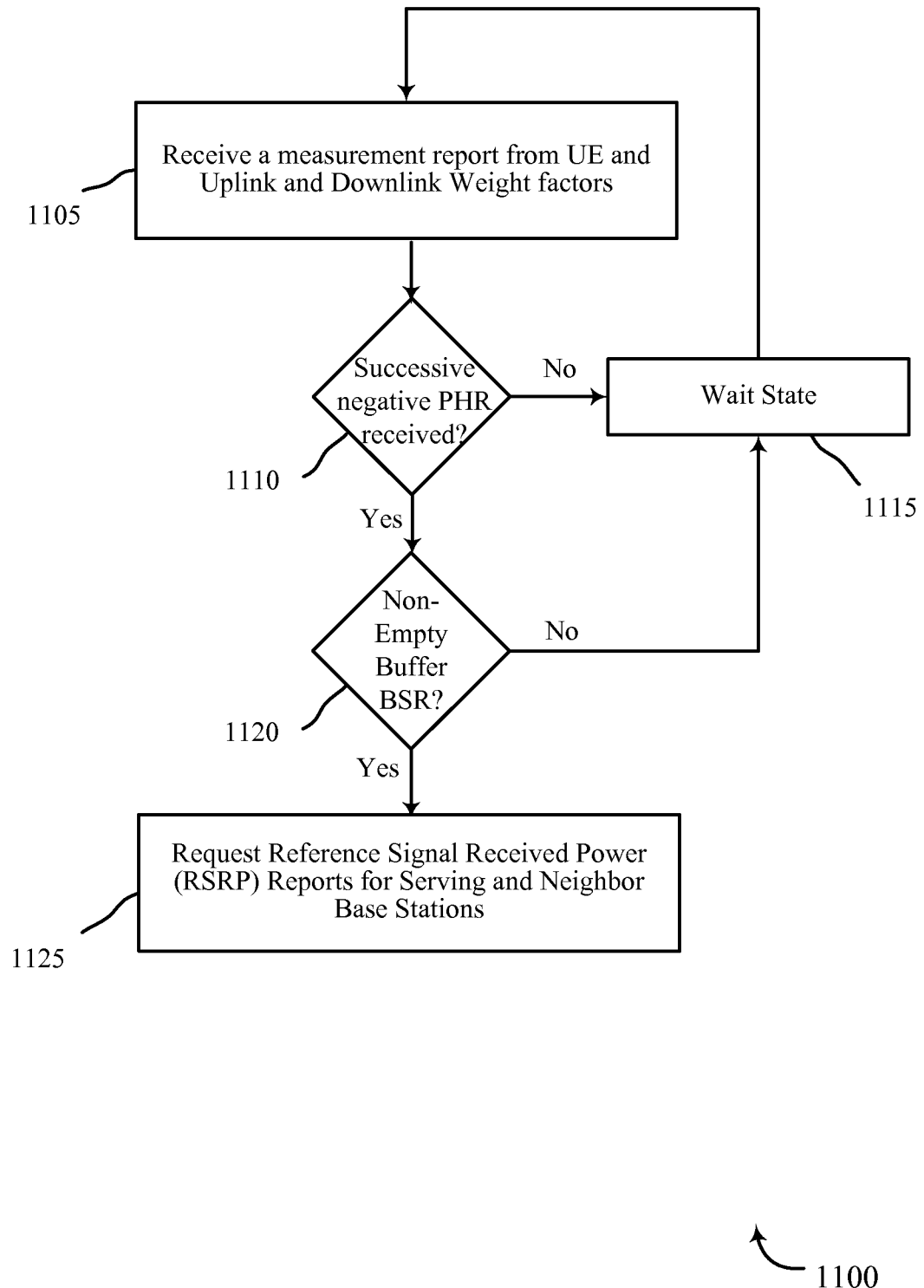
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105 described with reference to FIGS. 1, 2, 3, and/or 6. In some examples, a base station such as one of the base stations 105 may execute one or more sets of codes to control the functional elements of the base station to perform the functions described below.

At block 1105, the method 1100 may include receiving, at the serving base station, measurement reports from the UE that comprises at least one of uplink and downlink metrics. The uplink metrics may comprise at least one of PHR, BSR, RoT report and PRB report. The serving base station may further receive uplink and downlink weight factors. The operation(s) at block 1105 may be performed by the base station receiver module 205 as described with reference to FIGS. 2, 3 and/or 5.

At block 1110, the method 1100 may include determining whether the serving base station has received successive negative power headroom reports. The operation(s) at block 1110 may be performed by the measurement report analysis sub-module 505 as described with reference to FIGS. 5 and/or 6. The determination of the successive negative PHR reception may further be performed by power headroom report sub-module 605 as described with reference to FIG. 6. In some examples, a power headroom report sub-module 605 may receive and process measurement reports including PHRs indicating amount of transmission power a UE 115 may have remaining for data transmission. Reception and processing of successive negative PHR index by the power headroom report sub-module 605 may indicate to the serving base station 105-*a*, lack of transmission power remaining for the UEs 115. In contrast, processing positive PHR indexes may indicate sufficient remaining transmission power headroom available for the UEs 115. Therefore, the power headroom report sub-module 605 processes the received measurement PHR reports to estimate amount of uplink bandwidth that a UE may have remaining for subsequent data transfer.

At block 1115, and when the successive negative PHRs have not been received at the serving base station, the method of 1100 enters a wait state for a predetermined time period. The wait period may expire after either the predetermined time period or until the next measurement report is received at the serving base station 105 from the UE 115. Following the reception of updated measurement reports, the method of 1100 may again return to block 1105 and 1110 to determine if successive negative PHR have been received at the serving base station 105. The operation(s) at block 1115 may be performed by the handover management module 1115 as described with reference to FIGS. 3, 4 and/or 5. The operation(s) of block 1115 may further be performed by measurement report analysis sub-module as described with reference to FIGS. 5 and/or 6.

At block 1120, and when it is determined that the serving base station has received successive negative PHRs, the handover management module 505 may further determine whether the received BSR shows a non-empty buffer at the UE 115. A buffer status report (BSR) sub-module 610 may receive and process measurement reports indicating index value that represents amount of data remaining to be transmitted from the UE 115 to the serving base station 105-*a*. A higher BSR index value may represent to the serving base station relative need for improved uplink channel conditions. Similarly, a low index value may represents lack of data remaining to be transmitted from the UE to the serving base station and therefore corresponding value of uplink channel condition. When the BSR measurement report indicates that UE transmission buffer is empty, the method of 1100 returns to block 115 to wait for predetermined time period or until such time that an updated measurement report is received at the serving base station 105. The operation(s) at block 1120 may be performed by the measurement report analysis sub-module 505 as described with reference to FIGS. 5 and/or 6. The determination of the non-empty buffer BSR status may further be performed by the buffer status report sub-module 610 as described with reference to FIG. 6.

At block 1125, and when the buffer status report sub-module 610 determines that the UE transmission buffer is non-empty, a handover management module 310 as described with reference to FIGS. 3, 4 and/or 5, may issue a request to the UE 115 for reference signal received power (RSRP) reports for the serving 105-*a* and the neighbor base stations 105. The request may be forwarded to the base station transmitter module 215 as described with reference to FIGS. 2, 3 and/or 5 and/or antenna 645 and/or transceiver module 650 as described with reference to FIG. 6.

Figure 12:
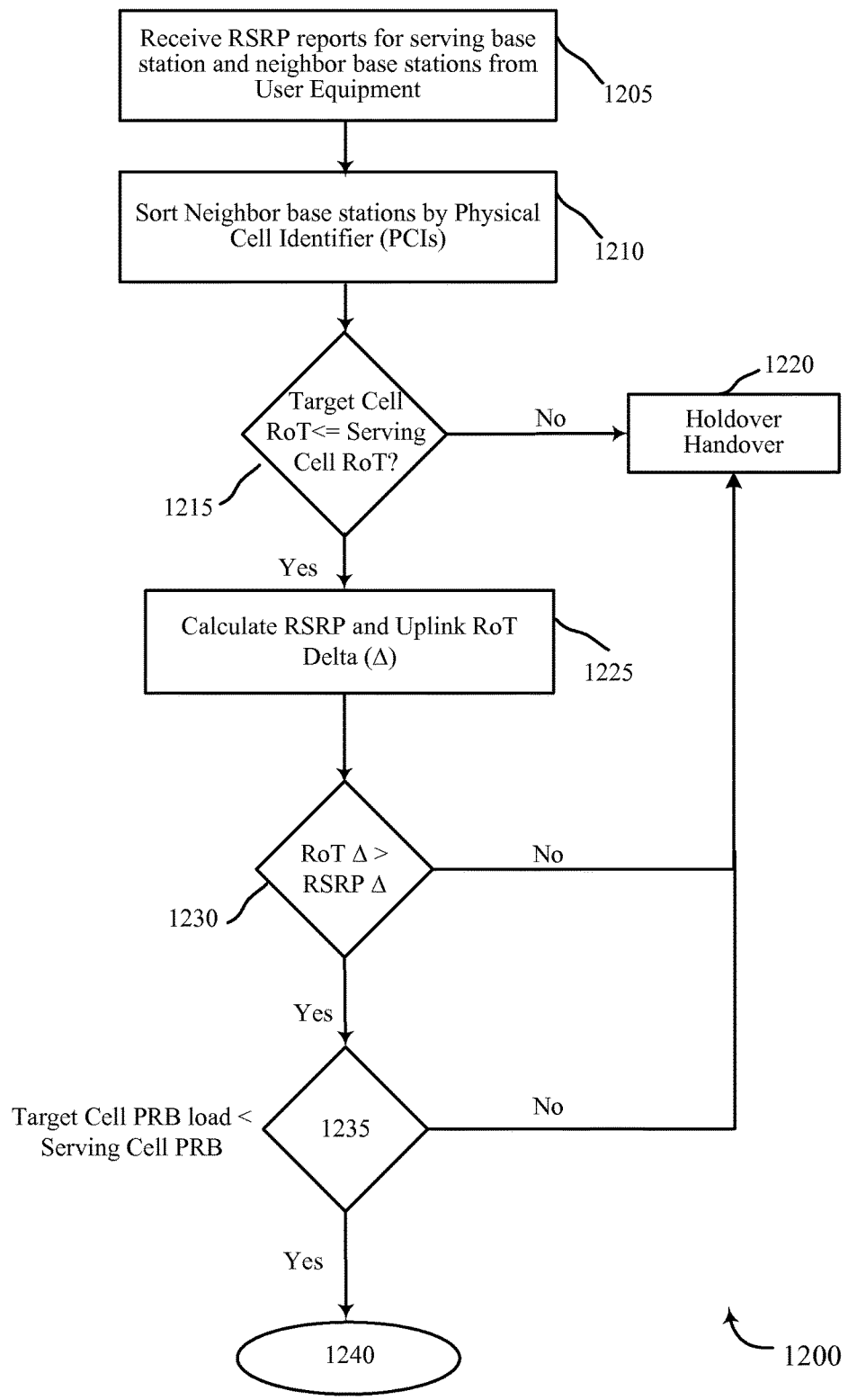
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 described with reference to FIGS. 1, 2, 3, and/or 6. In some examples, a base stations such as one of the base stations 105 may execute one or more sets of codes to control the functional elements of the base station to perform the functions described below.

At block 1205, the method 1200 may receive RSRP reports for the serving base station and neighbor base stations including respective physical cell identifier (PCIs) in response to the request transmitted in block 1125 described with reference to FIG. 11. The received RSRP reports may provide measured average power observed by the UEs 115 from the serving base station 105-a and neighbor base stations 105. In response to the received request as described in block 1125 of FIG. 11, the UE 115 may transmit the requested RSRP reports to the serving base station. The operation(s) of transmitting the RSRP report from the UE 115 to the base station 105 may be performed by user equipment transmitter module 715 as described with reference to FIGS. 7 and/or 8. The operation(s) at block 1205 of receiving the RSRP reports at the serving base station 105-a may be performed using the base station receiver module 205 described with reference to FIGS. 2, 3 and/or 5 and/or the handover control module 210 described with reference to FIGS. 2, 3, 4 and/or 5.

At block 1210, the method 1200 may sort the neighbor base stations 105 in descending order of RSRP based at least in part on the received PCIs. The descending order of neighbor base stations may represent average received power from UE 115 to the neighbor base station 105. The operation(s) at block 1210 may be performed by handover control module 210 described with reference to FIGS. 2, 3, 4 and/or 5.

At block 1215, the method 1200 may include determining whether the target cell 110-b RoT is less than or equal to the serving cell 110-a RoT. A Rise over Thermal (RoT) sub-module 615 may process the measurement reports associated with the uplink metrics including the ratio between the total interference received at a base station 105 and the thermal noise. In some embodiments, the RoT sub-module 615 may process received measurement reports and measure relative congestion at the serving base station in comparison with the congestion at the target base station. At block 1215, the handover management module 310 determines whether the relative congestion at the target cell 110-b is less than the congestion at the serving cell 110-a. The operation(s) at block 1215 may be performed by either the handover control module 210 described with reference to FIGS. 2, 3, 4 and/or 5 or more specifically the measurement report analysis sub-module 505 as described with reference to FIGS. 5 and/or 6.

At block 1220, and when the target cell RoT is not less than or equal to the serving cell RoT, the method 1200 holds over the handover process. The operation(s) of block 1220 may be performed by a handover holdover sub-module 520 as described with reference to FIG. 5. A handover holdover sub-module 520 may defer, prevent, inhibit or stop a handover process from being trigger based in part on the measurement report analyses. In some embodiments, the length of holdover may be based on a predetermined timer or events such as receiving, at the serving base station, updated measurement reports and weight factors associated with the uplink and downlink metrics. At the expiration of the predetermined timer or upon receiving updated measurement reports and weight factors associated with the uplink and downlink metrics, the measurement report analysis sub-module 505 and load comparison sub-module 510 may reevaluate whether to initiate, trigger or holdover the handover from a serving base station 105-a to a target base station 105-b. In certain examples, the predetermined timer may be indefinite. In some embodiments wherein the handover process is held over, prevented, deferred or inhibited, the UE 115 maintains communication with the serving base station 105 until such time as triggered by the handover trigger sub-module 515 based on an updated measurement report and weight factors.

At block 1225, and when the target cell RoT is less than or equal to the serving cell RoT, the serving base station calculates RSRP and uplink RoT delta ($\Delta$). In some examples, the uplink RoT delta ($\Delta$) represents the relative difference between the RoT of target cell 110-b less the RoT of the serving cell 110-a. The operation(s) at block 1225 may be performed by handover control module 210 described with reference to FIGS. 2, 3, 4 and/or 5.

At block 1230, the method 1200 may further determine whether the RoT ($\Delta$) representing the relative congestion difference between the target cell 110-b and the serving cell 110-a is greater than the RSRP delta ($\Delta$). If the base station 105 determines that the RoT ($\Delta$) is less the than RSRP ($\Delta$), the method proceeds to block 1220 to hold over the handover as described earlier. The operation(s) at block 1230 may be performed by handover control module 210 described with reference to FIGS. 2, 3, 4 and/or 5.

At block 1235, and when the method 1200 determines that the RoT ($\Delta$) is greater than RSRP ($\Delta$), the serving base station 105 may further determine whether the target cell PRB load is less than the serving cell PRB load. The operation(s) at block 1235 may be performed by handover control module 210 described with reference to FIGS. 2, 3, 4 and/or 5. The handover control module 210 may perform the determination of block 1235 by first determining the target cell uplink PRB load in comparison to the serving cell uplink PRB. Conversely the handover control module 210 may perform the determination of block 1235 by first determining the target cell downlink PRB load in comparison to the serving cell downlink PRB. In either example, if the target cell PRB load for the uplink and downlink metrics is less than the serving cell PRB with respect to the uplink and downlink metrics, the method 1200 proceeds to hold-over the handover process in block 1220 as discussed earlier. However, if it is determined that the target cell PRB load for uplink and downlink metrics is less than the serving cell PRB, the method 1200 proceeds to block 1240 which would be described further in FIG. 13.

Figure 13:
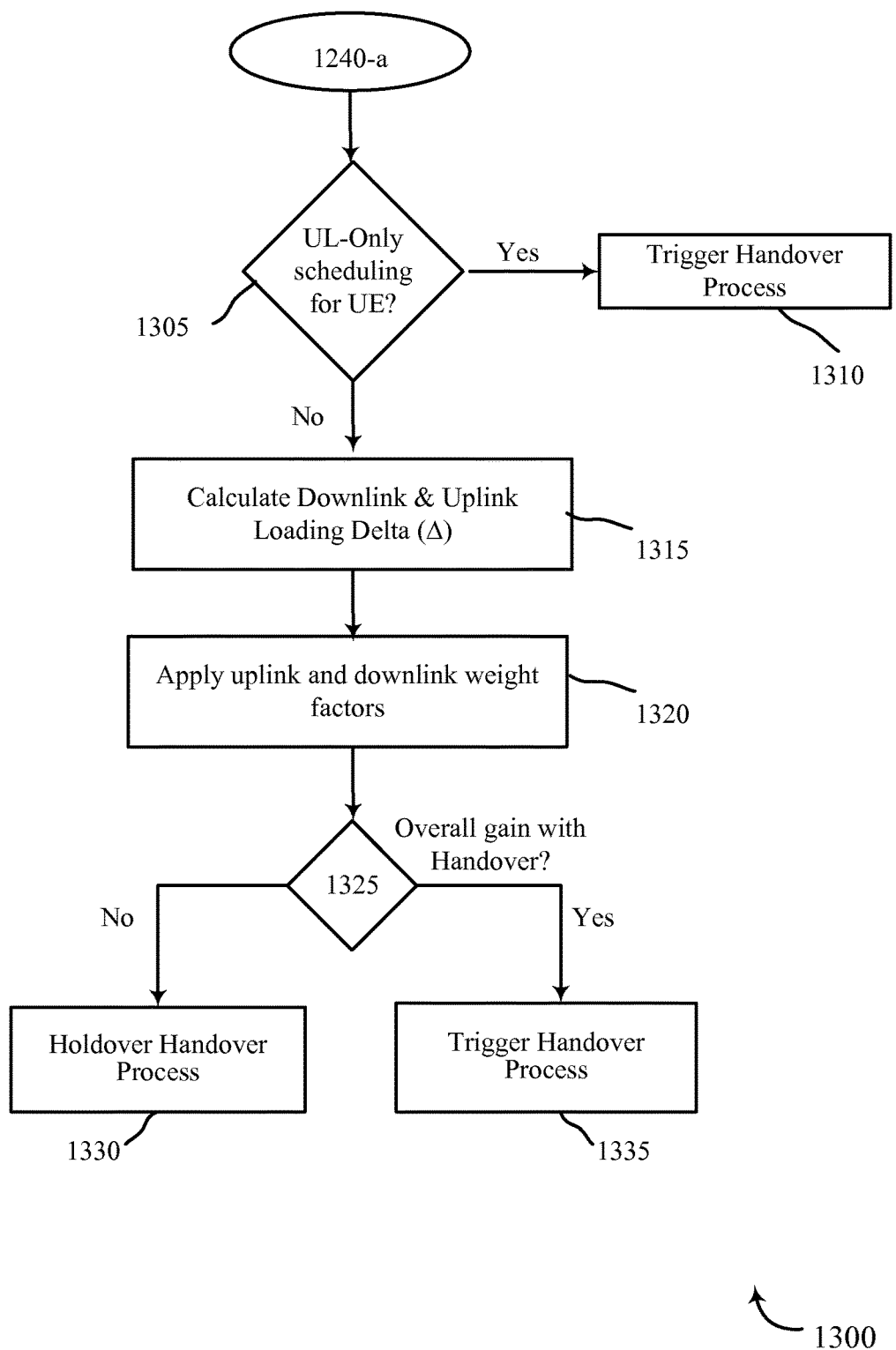
FIG. 13 is a flow chart illustrating an example of a method for wireless communication, in accordance with various aspects of the present disclosure.

FIG. 13 is a flow chart illustrating an example of a method 1300 for wireless communication that is a continuation of flowchart described in FIG. 12, in accordance with various aspects of the present disclosure. For clarity, the method 1300 is described below with reference to aspects of one or more of the base stations 105 described with reference to FIGS. 1, 2, 3, and/or 6. In some examples, a base stations such as one of the base stations 105 may execute one or more sets of codes to control the functional elements of the base station to perform the functions described below.

At block 1305, and when the target cell PRB load is less than the serving cell PRB, the serving cell determines whether the UE 115 is performing an uplink only scheduling. The operation(s) at block 1230 may be performed by handover control module 210 described with reference to FIGS. 2, 3, 4 and/or 5. The handover control module 210 makes such determination based on received measurement reports and weight factors associated with the uplink and downlink metrics. When it is determined that the UE 115 is performing uplink only data transfer, the handover control module triggers a handover process at block 1310. The operation(s) of block 1305 may be performed by handover trigger sub-module 515 as described with reference to FIG. 5. The handover trigger sub-module 515 may trigger a handover process by issuing a handover command control message to the UE 115-*a* in the execution phase to notify the UE 115-*a* that it will be handed over to a target base station 105-*b*. The handover trigger sub-module 515 may further issue a control message to a target base station 105-*b* notifying the target base station 105-*b* to prepare for the handover.

At block 1315, and when it is determined that the UE is not scheduled for uplink only communication, the serving base station calculates downlink and uplink loading delta (Δ). The operation(s) of block 1315 may be performed by the load comparison sub-module 512 as described with reference to FIG. 5. A load comparison sub-module 505 may calculate a downlink and uplink loading delta (Δ) that indicates an overall gain or loss that may be realized if a handover is triggered from the serving base station to the target base station based in part on the measurement report analysis provided by the measurement report analysis sub-module 505.

At block 1325, the method 1300 may further apply uplink and downlink weight factors to the received uplink and downlink metrics. The operation(s) of block 1320 may be performed by the weight factor application module 305 as described with reference to FIGS. 3 and/or 4. The weight factor application module 305 may receive plurality of weight factors associated with the uplink and the downlink metrics from the receiver module 205 as described with reference to FIG. 2 transmitted from the user equipment 115 as described with reference to FIG. 1. The weight factors may indicate to the base station relative value that a user equipment 115 places on its uplink and downlink transmission respectively. For example, if a user equipment 115 is engaged in primarily uplink data transfer (e.g., uploading pictures or video from the mobile device to the network or other UEs) with relatively low downlink transmission, the UE 115 may place greater weight factor on the uplink transmission as compared to the downlink transmission. In contrast, if a user equipment 115 is engaged in primarily downlink data transmission (e.g., downloading music or videos to the mobile device), the UE 115 may place greater weight factor value on the downlink transmission as compared to the uplink transmission. The weight factor application module 305 may apply plurality of received weight factors to the received uplink and downlink metrics received at the receiver module 205 from the user equipment 115.

At block 1325, the method 1300 determine whether, based in part on the calculated downlink and uplink loading delta and the associated weight factors, the UE would realize an overall gain or loss by transitioning communication from the serving base station 105-*a* to the target base station 105-*b*. The operation(s) of block 1325 may be performed by handover management module 310 as described with reference to FIGS. 3, 4, and/or 5.

At block 1330, the method 1300 may holdover a handover process if the UE 115 would realize a net loss by handing over from the serving base station 105-*a* to the target base station 105-*b*. The operation(s) of block 1330 may be performed by handover holdover sub-module 520 as described with reference to FIG. 5. A handover holdover sub-module 520 may defer, delay, prevent, inhibit or stop a handover process from being trigger based in part on the measurement report analyses, downlink and uplink loading delta (Δ) and weight factors associated with the uplink and downlink metrics. In some embodiments, the length of holdover may be based on a predetermined timer or events such as receiving, at the serving base station, updated measurement reports and weight factors associated with the uplink and downlink metrics. At the expiration of the predetermined timer or upon receiving updated measurement reports and weight factors associated with the uplink and downlink metrics, the measurement report analysis sub-module 505 and load comparison sub-module 510 may reevaluate whether to initiate, trigger or holdover the handover from a serving base station 105-*a* to a target base station 105-*b*. In certain examples, the predetermined timer may be for indefinite period of time. In some embodiments wherein the handover process is held over, deferred, prevented or inhibited, the UE 115 maintains communication with the serving base station 105 until such time as triggered by the handover trigger sub-module 515 based on an updated measurement report and weight factors.

At block 1335, the method 1300 may trigger a handover process if the serving base station 105-*a* determines that a UE 115 would realize an overall gain by triggering a handover from the serving base station 105-*a* to the target base station 105-*b*. The operation(s) of block 1335 may be performed by a handover trigger sub-module 515 as described with reference to FIG. 5. In some examples, a handover trigger sub-module 515 may trigger or initiate a handover process if a UE 115 would realize an overall gain by transferring communication from the serving base station 105-*a* to a target base station 105-*b* as previously described in FIG. 1. In one example, the handover trigger sub-module 515 may trigger a previously initiated handover process. The previously initiated handover process may have been initiated based solely on an event based downlink RSRP and/or RSRQ trigger received at the serving base station 105-*a*. In yet another example, the handover trigger sub-module 515 may either initiate or trigger a handover based in part on both the uplink and downlink metrics. The handover trigger sub-module 515, following a determination that either the uplink user experience would not be negatively impacted or conversely the UE would realize an overall gain based on the loading delta (Δ), the handover trigger sub-module 515 may trigger a handover process by issuing a handover command control message to the UE 115-*a* in the execution phase to notify the UE 115-*a* that it will be handed over to a target base station 105-*b*. The handover trigger sub-module 515 may further issue a control message to a target base station 105-*b* notifying the target base station 105-*b* to prepare for the handover.

Figure 14:
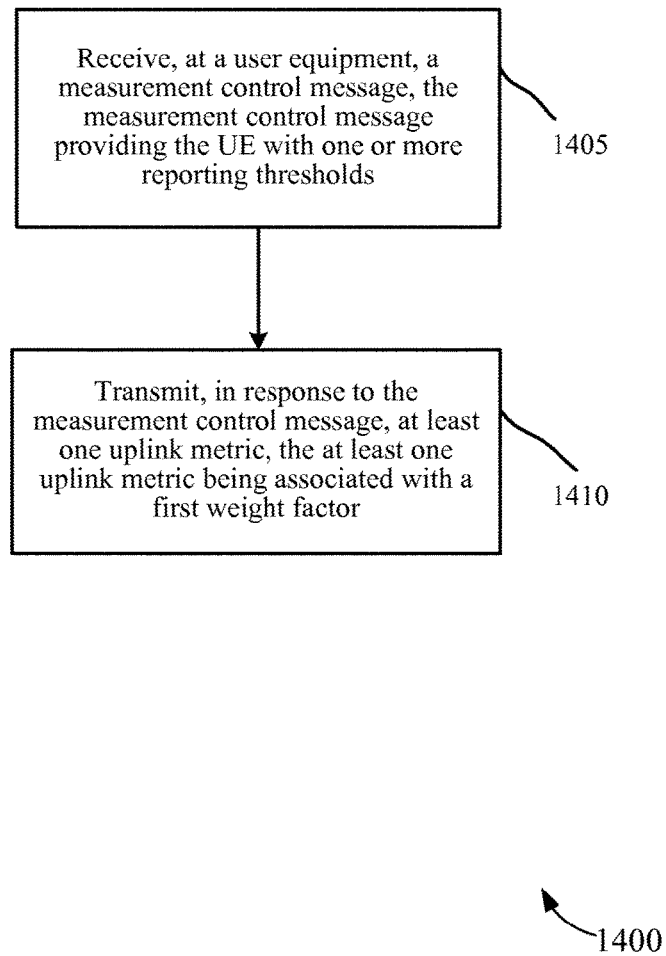
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 6, 7, 8A, and/or 8B. In some examples, the UE may execute one or more sets of codes to control the functional elements of the UE to perform the functions described below.

At block 1405, the method 1400 may include receiving, at a UE 115, a measurement control message. The measurement control message may provide the UE with one or more reporting thresholds. The operation(s) at block 1405 may be performed using the UE receiver module 705 described with reference to FIGS. 7, 8A and/or 8B.

At block 1410, the method 1400 may include transmitting, in response to the measurement control message, at least one uplink metric. The uplink metric may be associated with a first weight factor. The operation(s) at block 1410 may be performed using the weight allocation module 710 described with reference to FIGS. 7, 8A, and/or 8B. The operation(s) at block 1410 may also be performed by the UE transmitter module 715 as described with reference to FIGS. 7, 8A, and/or 8B in transmitting the uplink metrics and weight factors from the UE 115 to the base station 105.

In some examples, the method 1400 may further comprise transmitting, in response to the measurement control message, at least one downlink metric. The downlink metric may be associated with a second weight factor. In some examples, the first and second weight factors may define relative importance of uplink and downlink data transfer. In yet another example, the first and second weight factors may be either user-defined or preset by the UE.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing a handover in wireless communications, comprising:

receiving, at a serving base station, at least one uplink metric;

receiving a first weight factor associated with the at least one uplink metric, the first weight factor being indicative of a first user-defined importance level of an uplink transfer;

applying the first weight factor to the uplink metric to generate a weighted uplink metric;

receiving, at the serving base station, at least one downlink metric;

calculating an uplink and downlink loading delta, the loading delta indicating an overall gain or loss between a serving base station and a target base station, the loading delta being based at least in part on both the at least one uplink metric and the at least one downlink metric;

receiving a second weight factor associated with the at least one downlink metric, the second weight factor indicative of a second user-defined importance level of a downlink transfer;

applying the second weight factor to the downlink metric to generate a weighted downlink metric; and holding over a handover process from the serving base station to the target base station based at least in part on determining the difference between the weighted downlink metric and the weighted uplink metric satisfies a pre-determined threshold.

2. The method of claim 1, wherein the uplink metric comprises at least one of a power headroom report (PHR), a buffer status report (BSR), a Rise Over Thermal (RoT) report, and a Physical Resource Block (PRB) load report.

3. The method of claim 2, wherein the holding over the handover process comprises:

determining that the serving base station has received successive negative power headroom reports (PHR) and that the buffer status report (BSR) indicates non-empty buffer.

4. The method of claim 2, further comprising:

requesting a reference signal receive power (RSRP) report for the serving base station and at least one neighbor base station based at least in part on the received PHR and BSR;

receiving a RSRP report for the serving base station and at least one neighbor base station in response to the request; and sorting neighbor physical cell identity (PCIs) in descending order of the received RSRP report.

5. The method of claim 2, wherein the holding over the handover process comprises:

determining that a serving cell RoT is greater than a target cell RoT.

6. The method of claim 2, wherein the holding over the handover process comprises:

determining that a target cell uplink PRB load is less than a serving cell uplink PRB load.

7. The method of claim 1, further comprising:

holding over the handover process upon determining that a net loss would be realized based at least in part on the loading delta.

8. The method of claim 1, further comprising:

triggering the handover process upon determining that a net gain would be realized based at least in part on the loading delta.

9. The method of claim 1, further comprising:

holding over the handover process after a handover event trigger has occurred, the handover event trigger being based at least in part on one of a reference signal receive power (RSRP) metric or a reference signal receive quality (RSRQ) metric.

10. The method of claim 1, further comprising:

holding over the handover process prior to an occurrence of a handover event trigger, the handover event trigger being based at least in part on one of a reference signal receive power (RSRP) metric or a reference signal receive quality (RSRQ) metric.

11. The method of claim 1, wherein the holding over the handover process may comprise preventing, inhibiting, deferring or stopping the handover process.

12. An apparatus for managing a handover in wireless communications, comprising:

means for receiving, at a serving base station, at least one uplink metric;

means for receiving a first weight factor associated with the at least one uplink metric, the first weight factor indicative of a first user-defined importance level of an uplink transfer;

means for applying the first weight factor to the uplink metric to generate a weighted uplink metric;

means for receiving, at the serving base station, at least one downlink metric;

means for calculating an uplink and downlink loading delta, the loading delta indicating an overall gain or loss between a serving base station and a target base station, the loading delta being based at least in part on both the at least one uplink metric and the at least one downlink metric;

means for receiving a second weight factor, the second weight factor associated with the at least one downlink metric indicative of a second user-defined importance level of a downlink transfer;

means for applying the second weight factor to the downlink metric to generate a weighted downlink metric; and means for holding over a handover process from the serving base station to the target base station based at least in part on determining the difference between the weighted downlink metric and the weighted uplink metric satisfies a pre-determined threshold.

13. The apparatus of claim 12, wherein the uplink metric comprises at least one of a power headroom report (PHR), a buffer status report (BSR), a Rise Over Thermal (RoT) report, and a Physical Resource Block (PRB) load report.

14. The apparatus of claim 13, wherein the means for holding over the handover process comprises:

means for determining that the serving base station has received successive negative power headroom reports (PHR) and that the buffer status report (BSR) indicates non-empty buffer.

15. The apparatus of claim 13, further comprising:

means for requesting a reference signal receive power (RSRP) report for the serving base station and at least one neighbor base station based at least in part on the received PHR and BSR;

means for receiving a RSRP report for the serving base station and at least one neighbor base station in response to the request; and means for sorting neighbor physical cell identity (PCIs) in descending order of the received RSRP report.

16. The apparatus of claim 13, wherein the means for holding over the handover process comprises:

means for determining that a serving cell RoT is greater than a target cell RoT.

17. The apparatus of claim 13, wherein the means for holding over the handover process comprises:

means for determining that a target cell uplink PRB load is less than a serving cell uplink PRB load.

18. The apparatus of claim 12, further comprising:

means for holding over the handover process upon determining that a net loss would be realized based at least in part on the loading delta.

19. The apparatus of claim 12, further comprising:

means for triggering the handover process upon determining that a net gain would be realized based at least in part on the loading delta.

20. The apparatus of claim 12, further comprising:

means for holding over the handover process after a handover event trigger has occurred, the handover event trigger being based at least in part on one of a reference signal receive power (RSRP) metric or a reference signal receive quality (RSRQ) metric.

21. An apparatus for preparing for a network handover, comprising:

a processor;

a memory in electronic communications with the processor, the memory embodying instructions, the instructions being executable by the processor to:

receive, at a serving base station, at least one uplink metric;

receive a first weight factor associated with the at least one uplink metric, the first weight factor indicative of a first user-defined importance level of an uplink transfer;

apply the first weight factor to the uplink metric to generate a weighted uplink metric;

hold over a handover process from the serving base station to a target base station based at least on the weighted uplink metric;

receive, at the serving base station, at least one downlink metric;

calculate an uplink and downlink loading delta, the loading delta indicating an overall gain or loss between a serving base station and a target base station, the loading delta being based at least in part on both the at least one uplink metric and the at least one downlink metric;

receive a second weight factor associated with the at least one downlink metric, the second weight factor indicative of a second user-defined importance level of a downlink transfer;

apply the second weight factor to the downlink metric to generate a weighted downlink metric; and trigger the handover process from the serving base station to the target base station based at least in part on determining the difference between the weighted downlink metric and the weighted uplink metric satisfies a pre-determined threshold.

\* \* \* \* \*